US012759054B2

(12) United States Patent
Tanaka et al.

(10) Patent No.: US 12,759,054 B2

(45) Date of Patent: Oct. 13, 2026

(54) SEMI-FINISHED PIPE, METHOD FOR PRODUCING SEMI-FINISHED PIPE, PIPE, AND METHOD FOR PRODUCING PIPE

(71) Applicant: NANSHIN CO ., LTD., Nagano (JP)

(72) Inventors: Takaomi Tanaka, Nagano (JP); Shohei Matsuo, Nagano (JP)

(73) Assignee: NANSHIN CO., LTD., Nagano (JP)

( * ) Notice: Subject to any disclaimer, the term of this patent is extended or adjusted under 35 U.S.C. 154(b) by 558 days.

(21) Appl. No.: 18/366,683

(22) Filed: Aug. 8, 2023

(65) Prior Publication Data

US 2024/0017328 A1 Jan. 18, 2024

Related U.S. Application Data

(63) Continuation of application No. PCT/JP2022/003662, filed on Jan. 31, 2022.

(30) Foreign Application Priority Data

Feb. 9, 2021 (JP) ................................ 2021-018779

(51) Int. Cl.

*B23B 5/08* (2006.01)
*B23B 1/00* (2006.01)
*F16L 9/02* (2006.01)

(52) U.S. Cl.

CPC .................. *B23B 5/08* (2013.01); *B23B 1/00* (2013.01); *F16L 9/02* (2013.01)

(58) Field of Classification Search

CPC ................. B32B 5/08; B32B 1/00; F16L 9/02

(Continued)

(56) References Cited

U.S. PATENT DOCUMENTS 1,814,267 A * 7/1931 Swartz .................... B23P 15/10 29/888.011
2,196,303 A * 4/1940 Hensel ............... B23K 35/3006 420/580

(Continued)

FOREIGN PATENT DOCUMENTS

CN 102105246 A 6/2011
EP 2311588 A1 4/2011

(Continued)

OTHER PUBLICATIONS

Office Action in JP Application No. 2024-163398, mailed Oct. 28, 2025, 8pp.

(Continued)

*Primary Examiner* — David R Deal

(74) *Attorney, Agent, or Firm* — HAUPTMAN HAM, LLP

(57) ABSTRACT

This invention provides a semi-finished pipe used for forming a finished pipe by cutting performed by a lathe. The semi-finished pipe includes: a first layer for forming the finished pipe that remains even after cutting is performed by the lathe; and a second layer for a dummy use that does not remain after being cut by the lathe. According to the semi-finished pipe of the present invention, it is possible to provide the semi-finished pipe that is served for manufacturing a pipe having a small diameter (the finished pipe) using a lathe even when it is difficult for the lathe to perform cutting because of difficulty in grasping a pipe which is a target to be cut by a chucking jig due to a small outer diameter of the pipe.

6 Claims, 14 Drawing Sheets

(58) Field of Classification Search
USPC .......................................................... 138/140
See application file for complete search history.

(56) References Cited

U.S. PATENT DOCUMENTS

| | | | | |
|---|---|---|---|---|
| 2,930,115 | A * | 3/1960 | Dietzsch, Sr. | F02M 19/00 29/DIG. 12 |
| 11,045,879 | B2 * | 6/2021 | Nass | B23B 3/167 |
| 2011/0123827 | A1 | 5/2011 | Kazama et al. | |
| 2014/0014219 | A1 * | 1/2014 | Takemura | B32B 25/10 138/140 |
| 2018/0264556 | A1 * | 9/2018 | Silveira E Silva | B23B 5/08 |
| 2024/0344222 | A1 * | 10/2024 | Tanaka | C25D 1/02 |

FOREIGN PATENT DOCUMENTS

| | | | |
|---|---|---|---|
| JP | H01-099781 | A | 4/1989 |
| JP | 2001-162404 | A | 6/2001 |
| JP | 2007-223000 | A | 9/2007 |
| JP | 2008-116286 | A | 5/2008 |
| JP | 2012-213776 | A | 11/2012 |
| JP | 2019-116981 | A | 7/2019 |
| TW | 200609065 | A | 3/2006 |
| TW | I288035 | B | 10/2007 |
| TW | M592369 | U | 3/2020 |

OTHER PUBLICATIONS

Office Action in JP application No. 2022-580564, mailed Jul. 9, 2024, 5pp.
Office Action in KR application No. 10-2023-7026553, dated Jan. 20, 2025, 24pp.
International Search Report in PCT/JP2022/003662, mailed Mar. 22, 2022, 4pp.
Nanshin Co., Ltd., “Pipe Manufacturing”, Oct. 28, 2020, Micro-Pipe.com, https://micro-pipe.com/manufacture, 10pp.
Office Action in TW Application No. 111104218, mailed Sep. 21, 2022, 49pp.
Office Action in JP application No. 2022-580564, mailed Mar. 12, 2024, 16pp.
Office Action in TW application No. 112109195, dated Mar. 8, 2024, 9pp.
Office Action in CN application No. 202280013963.8, dated Aug. 31, 2025, 13pp.
Extended European search report in EP application No. 22752629.0, dated Dec. 20, 2024, 12pp.

* cited by examiner

| embodiment | wire 3 (core wire) | | first layer 11 (finished pipe constituting portion) | | | | second layer 12 (dummy member) | | | | | finished pipe 2 | | | | |
|---|---|---|---|---|---|---|---|---|---|---|---|---|---|---|---|---|
| | constitutional material | outer diameter D19 (mm) | constitutional material (first layer inner layer 11A) (first layer outer layer 11B) | layer thickness (μm) | outer diameter D1 (mm) | hardness (Hv) | constitutional material | layer thickness (μ) | outer diameter D3 (mm) | hardness (Hv) | machinability | constitutional material (first layer inner layer 11A) (first layer outer layer 11B) | layer thickness (μ) | outer diameter D5 (mm) | outer profile | hardness (Hv) |
| 1 | stainless steel | 0.20 | AuCo alloy (Co: 0.1 to 1.0%) | 1 | 0.25 | 150 to 200 | Cu (Cu: 99.0 to 99.7%) | 500 | 1.25 | 150 to 230 | good | AuCo alloy (Co: 0.1 to 1.0%) | 1 | 0.25 | protruding portion or recessed portion partially formed (or neither protruding portion nor recessed portion formed) | 150 to 200 |
| | | | NiCo alloy (Co: 4.0 to 35.0%) | 25 | | 400 to 550 | | | | | | NiCo alloy (Co: 4.0 to 35.0%) | 25 | | | 400 to 550 |

FIG.4

| embodiment | wire 3 (core wire) | | first layer 11 (finished pipe constitutional portion) | | | | second layer 12 (dummy member) | | | | | finished pipe 2 | | | | |
|---|---|---|---|---|---|---|---|---|---|---|---|---|---|---|---|---|
| | constitutional material | outer diameter D19 (mm) | constitutional material (first layer inner layer 11A) (first layer outer layer 11B) | layer thickness (μm) | outer diameter D1 (mm) | hardness (Hv) | constitutional material | layer thickness (μ) | outer diameter D3 (mm) | hardness (Hv) | machinability | constitutional material (first layer inner layer 11A) (first layer outer layer 11B) | layer thickness (μ) | outer diameter D5 (mm) | outer profile | hardness (Hv) |
| 2 | stainless steel | 0.03 | AuCo alloy (Co: 0.1 to 1.0 %) | 1 | 0.20 | 150 to 200 | NiMn alloy (Mn: 0.1 to 0.7%) | 100 | 0.40 | 350 to 420 | good | AuCo alloy (Co: 0.1 to 1.0%) | 1 | 0.15 | protruding portion or recessed portion partially formed (or neither protruding portion nor recessed portion formed) | 150 to 200 |
| | | | NiCo alloy (Co: 4.0 to 35.0%) | 84 | | 400 to 550 | | | | | | NiCo alloy (Co: 4.0 to 35.0%) | 59 | | | 400 to 550 |
| 3 | stainless steel | 0.10 | Ni/PTFE composite (PTEF: 10 to 50%) | 50 | 0.60 | 150 to 200 | NiMn alloy (Mn: 0.1 to 0.7%) | 50 | 0.80 | 350 to 420 | good | Ni/PTFE composite (PTEF: 10 to 50%) | 50 | 0.60 | protruding portion or recessed portion partially formed/tapered protruding portion or tapered recessed portion (or neither protruding portion nor recessed portion formed) | 150 to 200 |
| | | | NiCo alloy (Co: 4.0 to 35.0 %) | 200 | | 400 to 550 | | | | | | NiCo alloy (Co: 4.0 to 35.0%) | 200 | | | 400 to 550 |
| 4 | stainless steel | 0.15 | AuNi alloy (Ni: 1.0 to 4.0%) | 2 | 0.50 | 220 to 260 | NiMn alloy (Mn: 0.1 to 0.7%) | 195 | 0.60 | 350 to 420 | good | AuNi alloy (Ni: 1.0 to 4.0%) | 2 | 0.20 | protruding portion or recessed portion partially formed (or neither protruding portion nor recessed portion formed) | 220 to 260 |
| | | | NiCo alloy (Co: 4.0 to 35.0%) | 28 | | 400 to 550 | | | | | | NiCo alloy (Co: 4.0 to 35.0%) | 23 | | | 400 to 550 |
| 5 | stainless steel | 0.15 | Pd (99.7 to 99.9%) | 2 | 0.50 | 220 to 260 | NiMn alloy (Mn: 0.1 to 0.7%) | 195 | 0.60 | 350 to 420 | good | Pd (99.7 to 99.9%) | 2 | 0.20 | protruding portion or recessed portion partially formed (or neither protruding portion nor recessed portion formed) | 220 to 260 |
| | | | NiCo alloy (Co: 4.0 to 35.0%) | 28 | | 400 to 550 | | | | | | NNiCo alloy (Co: 4.0 to 35.0%) | 23 | | | 400 to 550 |
| 6 | stainless steel | 0.20 | AuCo alloy (Co: 0.1 to 1.0%) | 1 | 0.24 | 150 to 200 | Cu (Cu: 99.0 to 99.7%) | 180 | 0.60 | 150 to 230 | excellent | AuCo alloy (Co: 0.1 to 1.0%) | 1 | 0.24 | protruding portion or recessed portion partially formed (or neither protruding portion nor recessed portion formed) | 150 to 200 |
| | | | NiMn alloy (Mn: 0.1 to 0.7%) | 19 | | 350 to 420 | | | | | | NiMn alloy (Mn: 0.1 to 0.7%) | 19 | | | 350 to 420 |
| 7 | stainless steel | 0.15 | AuCo alloy (Co: 0.1 to 1.0%) | 1 | 0.20 | 150 to 200 | NiMn alloy (Mn: 0.1 to 0.7%) | 150 | 0.50 | 350 to 420 | good | AuCo alloy (Co:0.1 to 1.0%) | 2 | 0.20 | recessed portion at both ends, or recessed portion (or neither protruding portion nor recessed portion formed) | 220 to 260 |
| | | | NiCo alloy (Co: 4.0 to 35.0%) | 24 | | 400 to 550 | | | | | | NiCo alloy (Co: 4.0 to 35.0%) | 23 | | | 400 to 550 |
| 8 | stainless steel | 0.08 | AuCo alloy (Co: 0.1 to 1.0%) | 1 | 0.12 | 150 to 200 | NiMn alloy (Mn: 0.1 to 0.7%) | 240 | 0.60 | 350 to 420 | good | AuCo alloy (Co: 0.1 to 1.0%) | 1 | 0.12 | protruding portion or recessed portion partially formed (or neither protruding portion nor recessed portion formed) | 150 to 200 |
| | | | NiMn alloy (Mn: 0.1 to 0.7%) | 19 | | 350 to 420 | | | | | | NiMn alloy (Mn: 0.1 to 0.7%) | 19 | | | 350 to 420 |

FIG.6

| embodiment | wire 3 (core wire) | | first layer 11 (finished pipe constituting portion) | | | | second layer 12 (dummy member) | | | | | finished pipe 2 | | | | |
|---|---|---|---|---|---|---|---|---|---|---|---|---|---|---|---|---|
| | constitutional material | outer diameter D19 (mm) | constitutional material (first layer inner layer 11A) (first layer outer layer 11B) | layer thickness (μm) | outer diameter D1 (mm) | hardness (Hv) | constitutional material | layer thickness μ | outer diameter D3 (mm) | hardness (Hv) | machinability | constitutional material (first layer inner layer 11A) (first layer outer layer 11B) (second layer 12) | layer thickness (μm) | outer diameter D5 (mm) | outer profile | hardness (Hv) |
| 9 | stainless steel | 0.20 | AuCo alloy (Co: 0.1 to 1.0%) | 1 | 0.25 | 150 to 200 | Cu (Cu: 99.0 to 99.7%) | 50 | 1.25 | 150 to 230 | good | AuCo alloy (Co: 0.1 to 1.0 %) | 1 | 0.27 | protruding portion or recessed portion partially formed (or neither protruding portion nor recessed portion formed) | 150 to 200 |
| | | | NiCo alloy (Co: 4.0 to 35.0%) | 25 | | 400 to 550 | | | | | | NiCo alloy (Co: 4.0 to 35.0%) | 25 | | | 400 to 550 |
| | | | | | | | | | | | | Cu (Cu: 99.0 to 99.7%) | 10 | | | 150 to 230 |
| 10 | stainless steel | 0.20 | AuCo alloy (Co: 0.1 to 1.0%) | 1 | 0.24 | 150 to 200 | Cu (Cu: 99.0 to 99.7%) | 180 | 0.60 | 150 to 230 | excellent | AuCo alloy (Co: 0.1 to 1.0%) | 1 | 0.30 | protruding portion or recessed portion partially formed (or neither protruding portion nor recessed portion formed) | 150 to 200 |
| | | | NiMn alloy (Mn: 0.1 to 0.7%) | 19 | | 350 to 420 | | | | | | NiMn alloy (Mn: 0.1 to 0.7%) | 19 | | | 350 to 420 |
| | | | | | | | | | | | | Cu (Cu: 99.0 % to 99.7%) | 30 | | | 150 to 230 |
| 11 | stainless steel | 0.40 | AuCo alloy (Co: 0.1 to 1.0%) | 1 | 0.50 | 150 to 200 | NiMn alloy (Mn: 0.1 to 0.7%) | 50 | 0.60 | 350 to 420 | good | AuCo alloy (Co: 0.1 to 1.0%) | 1 | 0.58 | protruding portion or recessed portion partially formed (or neither protruding portion nor recessed portion formed) | 150 to 200 |
| | | | NiCo alloy (Co: 4.0 to 35.0%) | 49 | | 400 to 550 | | | | | | NiCo alloy (Co: 4.0 to 35.0%) | 49 | | | 400 to 550 |
| | | | | | | | | | | | | NiMu alloy (Mn: 0.1 to 0.7%) | 40 | | | 350 to 420 |

FIG.8

| embodiment | wire 3 (core wire) | | first layer 11 (finished pipe constituting portion) before alloying | | | | second layer 12 (dummy member) before alloying | | | | | finished pipe 2 after alloying | | | | |
|---|---|---|---|---|---|---|---|---|---|---|---|---|---|---|---|---|
| | constitutional material | outer diameter D19 (mm) | constitutional material | layer thickness (μm) | outer diameter D1 (mm) | hardness of outer peripheral surface (Hv) | constitutional material | layer thickness (μ) | outer diameter D3 (mm) | hardness (Hv) | machinability | constitutional material | layer thickness (μ) | outer diameter D6 (mm) | outer profile | hardness (Hv) |
| 12 | stainless steel | 0.200 | Pd | 2 | 0.204 | 180 to 240 | Cu (Cu: 99.0 to 99.7%) | 523 | 1.250 | 150~230 | good | CuPd alloy | 10<br>(8+2) | 0.220 | neither recessed portion nor protruding portion (or recessed portion or protruding portion being present) | 250 to 400 |
| 13 | stainless steel | 0.200 | Ag (first layer inner layer 11A)<br>Pd (first layer outer layer 11B) | 1<br>1 | 0.204 | 180 to 240 | Cu (Cu: 99.0 to 99.7%) | 523 | 1.250 | 150~230 | good | CuAgPd alloy | 10<br>(8+1+1) | 0.220 | neither recessed portion nor protruding portion (or recessed portion or protruding portion being present) | 250 to 400 |
| 14 | stainless steel | 0.215 | [AuCo alloy (third layer)]<br>[Ni (intermediate layer)]<br>Pd (first layer 11) | 1<br>1<br>2 | 0.223 | 180 to 240 | Cu (Cu: 99.0 to 99.7%) | 188.5 | 0.600 | 150~230 | good | AuCo alloy (third layer)<br>Ni (intermediate layer)<br>CuPd alloy (outer layer) | 1<br>1<br>10.5<br>(8.5+2) | 0.240 | neither recessed portion nor protruding portion (or recessed portion or protruding portion being present) | 250 to 400 |
| 15 | stainless steel | 0.180 | [AuCo alloy (third layer)]<br>[Ni (intermediate layer)]<br>Ag (first layer inner layer 11A)<br>Pd (first layer outer layer 11B) | 1<br>1<br>3<br>3 | 0.196 | 180 to 240 | Cu (Cu: 99.0 to 99.7%) | 202 | 0.600 | 150~230 | good | AuCo alloy (third layer)<br>Ni (intermediate layer)<br>CuAgPd alloy (outer layer) | 1<br>1<br>18<br>(12+3+3) | 0.220 | neither recessed portion nor protruding portion (or recessed portion or protruding portion being present) | 250 to 400 |
| 16 | stainless steel | 0.080 | [AuNi alloy (third layer)]<br>[Ni (intermediate layer)]<br>Pd (first layer 11) | 2<br>1<br>3 | 0.092 | 180 to 240 | Cu (Cu: 99.0 to 99.7%) | 254 | 0.600 | 150~230 | good | AuNi alloy (third layer)<br>Ni (intermediate layer)<br>CuPd alloy (outer layer) | 2<br>1<br>7<br>(4+3) | 0.100 | neither recessed portion nor protruding portion (or recessed portion or protruding portion being present) | 250 to 400 |

FIG.11

SEMI-FINISHED PIPE, METHOD FOR PRODUCING SEMI-FINISHED PIPE, PIPE, AND METHOD FOR PRODUCING PIPE

RELATED APPLICATIONS

The present application is a continuation of National Phase of International Application No. PCT/JP2022/003662 filed Jan. 31, 2022, which claims priority to Japanese Application No. 2021-018779, filed Feb. 9, 2021, the disclosures of which applications are hereby incorporated by reference herein in their entirety.

TECHNICAL FIELD

The present invention relates to a semi-finished pipe, a method for producing semi-finished pipe, a pipe, and a method for producing a pipe. Here, "semi-finished pipe" is a so-called intermediate product of a pipe which is provided as a finished product, is in a state where the pipe can be sold.

BACKGROUND ART

Recently, in various fields, a need for an elongated pipe having an extremely small outer diameter has been increasing. For example, such an elongated pipe is a metal-made tube that is called as a micro tube or a micro pipe that is used as a pipe for a contact probe served for inspection of a semiconductor, a nozzle for medical use/printing use, a pipe for optical communication connector, a metal ferrule for optical communication.

With respect to such a pipe, there exists a case where it is desirable to form a recessed portion or a protruding portion on a surface of the pipe for mounting the pipe on a device to which the pipe is attached, or for forming a mark that indicates a manufacturer of the pipe or the like.

For example, a case is considered where a contact probe for semiconductor inspection is manufactured by inserting a contact pin (plunger) and a spring for generating a restoring force in a pipe (a barrel). In such a case, by forming a protruding portion on an outer side of the pipe and by allowing the protruding portion engage with a recessed portion formed on a mounting portion by fitting engagement, it is possible to prevent the easy removal of the contact probe thus enabling the highly reliable inspection of electrodes of miniaturized and highly densified semiconductors.

CITATION LIST

Patent Literature

PTL 1: Japanese Laid-open publication 2001-162404

SUMMARY OF INVENTION

Technical Problem

PTL 1, discloses, as illustrated in FIG. 14, a technique where a cylindrical base body having high accuracy is manufactured by applying cutting to a surface of a cylindrical work directly using a conventional lathe. In this technique, a jig for a lathe that holds a cylindrical work 9120 includes a pair of pressing members 9112, 9114 having a circular columnar shape, and the pressing members 9112, 9114 have recessed portions 9122, 9124 into which end portions of a shaft 9116 are insertable. In applying cutting to a surface of the cylindrical work using the jig for a lathe, the shaft 9116 is made to pass through the cylindrical work 9120, a gap formed between the shaft 9116 and the cylindrical work 9120 is filled with a filling member 9118 thus holding the cylindrical work 9120, and a surface of the cylindrical work 9120 is cut.

The technique disclosed in PTL 1 is useful when a diameter of the cylindrical work 9120 is large as in the case of manufacturing a cylindrical base body such as a base body of an electrophotographic photoreceptor or a developing sleeve for an electrophotography.

However, for example, with respect to an extremely small pipe having an outer diameter of 0.6 mm or more to less than 1.0 mm, an inner diameter of the pipe is further smaller. Accordingly, it is almost impossible to allow the shaft 9116 described in PTL 1 to pass through the pipe or to fill the gap with the filling member 9118. So, it is difficult to perform cutting on the surface of the pipe by the method described in PTL 1.

Further, with respect to the pipe having the extremely small outer diameter, usually, the pipe cannot be grasped by chucking jigs of the lathe, or even when the pipe is grasped, the grasping becomes unstable and hence, it is extremely difficult to provide a pipe on which a recessed portion or a protruding portion is formed by performing cutting on a surface of the pipe.

In view of the above-mentioned circumstances, it is an object of the present invention to provide a method where, even with the use of a lathe that is difficult to perform cutting on a pipe that has a small outer diameter so that gripping of the pipe by chucking jigs is difficult, a pipe having a recessed portion or a protruding portion on a surface of the pipe and having a small diameter can be manufactured by using the lathe, and also to provide such a pipe.

Further, there also exists a user who wants to manufacture a pipe (a finished pipe) of a small outer diameter having a recessed portion or a protruding portion of a desired shape on a surface of the pipe by receiving the offer of, instead of a pipe as a final product (finished pipe), a pipe in a preceding stage of the finished pipe, that is, a pipe which is a so-called semi-finished product (semi-finished pipe) and applying cutting the semi-finished pipe. There is a market that needs such semi-finished pipes. In view of the above, it is another object of the present invention to provide a semi-finished pipe and a method for manufacturing the semi-finished pipe that are served for manufacturing (making use of, being available to) a pipe having a recessed portion or a protruding portion on a surface of the pipe and having a small diameter can be manufactured by using the lathe even with the use of a lathe that is difficult to apply cutting to a pipe that has a small outer diameter so that gripping of a pipe by chucking jigs is difficult.

Solution to Problem

[1] A semi-finished pipe (first semi-finished pipe) of the present invention is a semi-finished pipe (first semi-finished pipe) used for forming a finished pipe by cutting performed by a lathe, the semi-finished pipe including a first layer for forming the finished pipe that remains even after cutting performed by the lathe; and a second layer for a dummy use that is formed on an outer side of the first layer, and forms an object to be cut by the lathe.

"Finished pipe" is a pipe that is compared with "semi-finished pipe" and forms a finished product.

It does not matter whether the pipe itself becomes a marketing object or the pipe becomes a part of a product.

"For a dummy use" means that the pipe is not used for finished pipe configuration, and is used for grasping by a chucking jig.

The first layer may be formed mainly using a rare metal (minor metal), and the second layer may be formed mainly using common metal (base metal).

According to such a semi-finished pipe (first semi-finished pipe), it comprises that, on an outer side of the first layer for forming the finished pipe that remains even after cutting performed by a lathe, the second layer for a dummy use that becomes an object to be cut by a lathe is formed. So, it is possible to provide the semi-finished pipe that is served for manufacturing the pipe (finished pipe) having small diameter and having a recessed portion or a protruding portion on the surface using such a lathe by grasping the second layer for a dummy use, even with a lathe which is difficult to perform cutting due to difficulty in grasping by the chucking jig when an outer diameter of the semi-finished pipe is small.

In this specification, "chucking jig" includes a jaw chuck (a jaw), a jig that grasps a pipe by contact or face contact such as an open fixture or a closed fixture, in addition to a jig that grasps a pipe using jaws such as a three-jaw chuck. The collet chuck is a kind of the closed fixture, and it is preferable to use the collet chuck as a chucking jig.

[2] With respect to the semi-finished pipe (the first semi-finished pipe) described above, it is preferable that an outer diameter of the first layer be an outer diameter close to an outer diameter of the finished pipe.

[3] With respect to the semi-finished pipe (the first semi-finished pipe) described above, it is preferable that the first layer have a small outer diameter that makes grasping of the semi-finished pipe by a chucking jig of the lathe difficult, and the second layer have a large outer diameter that enables grasping of the semi-finished pipe by the chucking jig of the lathe.

[4] With respect to the semi-finished pipe (the first semi-finished pipe) described above, it is preferable that the first layer have an outer diameter of 0.05 mm or more and less than 0.60 mm, and the second layer have an outer diameter of 0.40 mm or more and 3.00 mm or less. It is more preferable that the first layer have an outer diameter of 0.05 mm or more and less than 0.50 mm, and the second layer have an outer diameter of 0.50 mm or more and 2.00 mm or less. It is further more preferable that the first layer have an outer diameter of 0.10 mm or more and less than 0.40 mm, and the second layer have an outer diameter of 0.40 mm or more and 1.00 mm or less. It is further more preferable that the first layer have an outer diameter of 0.10 mm or more and less than 0.30 mm, and the second layer have an outer diameter of 0.40 mm or more and 0.60 mm or less.

[5] With respect to the semi-finished pipe (the first semi-finished pipe) described above, it is preferable that the second layer have more favorable machinability than at least a neighboring portion of the first layer close to the second layer.

[6] With respect to the semi-finished pipe (the first semi-finished pipe) described above, it is preferable that the first layer includes: a first layer outer layer that forms a neighboring portion with the second layer, and a first layer inner layer that is formed on an inner side of the first layer outer layer, and Vicker's hardness of the first layer outer layer falls within a range of 350 to 550 Hv.

[7] With respect to the semi-finished pipe (the first semi-finished pipe) described above, it is preferable that the first layer inner layer be made of any one of gold, a gold-cobalt alloy, palladium, a palladium alloy, or a eutectoid of polytetrafluoroethylene and nickel, the first outer layer be made of any one of a nickel cobalt alloy, a nickel manganese alloy, or pure nickel, and the second layer be made of any one of copper, pure nickel, or a nickel manganese alloy.

Polytetrafluoroethylene (PTFE) is a fluororesin containing only fluorine atoms and carbon atoms.

Further, as pure nickel, for example, NC—Ni (Ni200) (usual pure nickel), LC—Ni (Ni201) (containing particularly low carbon content), D-Ni (added with small amount of aluminum and a small amount of titanium), A-Ni (highly pure nickel having purity of 99.7% or more), K—Ni (highly pure nickel having purity of 99.5% or more) and the like are named (marketed by Hitachi Metals, Ltd. and the like).

[8] A method of manufacturing a semi-finished pipe (a first semi-finished pipe) of the present invention is a method of manufacturing a semi-finished pipe used for forming a finished pipe by cutting performed by a lathe, the method include: a step of preparing a wire; a step of forming a first layer for forming the finished pipe that remains on an outer peripheral side of the wire even after cutting performed by the lathe; and a step of forming a second layer for a dummy use that becomes an object to be cut by cutting performed by the lathe on an outer peripheral side of the first layer.

According to such a method of manufacturing the semi-finished pipe (first semi-finished pipe), the first layer for forming the finished pipe that remains even after cutting performed by a lathe is formed on the wire, and the second layer for dummy use that becomes an object to be cut by the lathe is formed on an outer side of the first layer. So, by grasping the second layer for dummy use, even if, with a lathe which is difficult to perform cutting due to difficulty in grasping by the chucking jig when an outer diameter of the semi-finished pipe is small, it is possible to provide the semi-finished pipe manufacturing method that is served for manufacturing the pipe (finished pipe) having a small outer diameter, with a recessed portion or a protruding portion on the surface using such a lathe.

[9] A method for manufacturing a semi-finished pipe (a second semi-finished pipe) of the present invention is a semi-finished pipe manufacturing method for manufacturing a second semi-finished pipe further closer to a finished pipe from a semi-finished pipe using a lathe, the semi-finished pipe manufacturing method including: a step of preparing the above-mentioned semi-finished pipe (the first semi-finished pipe); a grasping step of grasping the semi-finished pipe (the first semi-finished pipe) from an outer side of the second layer; a cutting step of forming a recessed portion or a protruding portion on the first layer by cutting from the outer side the second layer; and a step of forming the second semi-finished pipe in a state where the grasped portion and a portion on which the recessed portion or the protruding portion is formed are connected to each other.

With such a method of manufacturing the semi-finished pipe (second semi-finished pipe), the first semi-finished pipe can be grasped from an outer side of the second layer, and the recessed portion or the protruding portion can be formed on the first layer. And, semi-finished pipe (the second semi-finished pipe) is formed in a state where the grasped portion and the portion on which the recessed portion or the protruding portion is formed are connected to each other. Accordingly, the finished pipe can be manufactured by cutting off such a semi-finished pipe (the second semi-finished pipe). In this manner, according to this manufacturing method, even if, with a lathe which is difficult to perform cutting due to difficulty in grasping by the chucking jig when an outer diameter of the semi-finished pipe is small, it is possible to provide the method for manufacturing the semi-finished pipe (second semi-finished pipe) capable of manufacturing the pipe (finished-pipe) having a small outer diameter, with a recessed portion or a protruding portion on the surface using such a lathe.

[10] The semi-finished pipe (the second semi-finished pipe) of the present invention, is a semi-finished pipe (the second semi-finished pipe) used for manufacturing a finished pipe by cutting a predetermined portion of the semi-finished pipe, the semi-finished pipe comprising: a dummy layer stacking portion where a first layer for forming the finished pipe and a second layer for a dummy use formed on an outer side of the first layer are stacked to each other; and a first layer unevenness forming portion where a recessed portion or a protruding portion is formed.

With such a configuration, the finished pipe can be formed by cutting off the first layer unevenness forming portion while grasping the dummy layer stacking portion. Accordingly, it is possible to provide the semi-finished pipe (the second semi-finished pipe) that served for manufacturing the pipe (the finished pipe) having a small outer diameter, with the recessed portion or the protruding portion on the surface of the pipe.

[11] A pipe (finished pipe) manufacturing method of the present invention includes: a step of preparing the above-mentioned semi-finished pipe (the second semi-finished pipe); a grasping step of grasping the semi-finished pipe at the dummy layer stacking portion; and a cutting-off step of cutting off the first layer unevenness forming portion from a dummy layer stacked side.

With such a pipe (finished pipe) manufacturing method, the finished pipe can be formed by cutting off the first layer unevenness forming portion while grasping the dummy layer stacking portion. Accordingly, it is possible to provide the semi-finished pipe (the second semi-finished pipe) manufacturing method that is served for manufacturing the pipe (the finished pipe) having a small outer diameter, with the recessed portion or the protruding portion on the surface of the pipe.

[12] A pipe (finished pipe) manufacturing method of the present invention is a pipe manufacturing method for manufacturing a finished pipe from a semi-finished pipe using a lathe, the pipe manufacturing method including: a step of preparing the above-mentioned semi-finished pipe (first semi-finished pipe); a grasping step of grasping the semi-finished pipe (first semi-finished pipe) from an outer side of the second layer; a cutting step of forming a recessed portion or a protruding portion on the first layer by cutting from the outer side of the second layer; and a cutting-off step of cutting off a predetermined portion of the semi-finished pipe (first semi-finished pipe).

According to such a pipe (finished pipe) manufacturing method, even if, with a lathe which is difficult to perform cutting due to difficulty in grasping by the chucking jig when an outer diameter of the semi-finished pipe is small, it is possible to provide the semi-finished pipe that is served for manufacturing the pipe (finished pipe) having a small outer diameter, with a recessed portion or a protruding portion on the surface using such a lathe.

[13] With respect to the pipe (finished pipe) manufacturing method according to the present invention, it is preferable that the second layer be cut in the cutting step such that a part of the second layer remains, in manufacturing the semi-finished pipe (the first semi-finished pipe or the second semi-finished pipe).

According to such a pipe (finished pipe) manufacturing method, by leaving a part of the second layer, a depth of the recessed portion or a height of the protruding portion) can be easily adjusted, or an electromagnetic shield can be made.

[14] A pipe (finished pipe) of the present invention is made of metal, and has an outer diameter of 0.05 mm or more and less than 0.60 mm, and has a recessed portion or a protruding portion on an outer periphery of the pipe and a cut mark on the cut portion.

In a case where such a pipe (finished pipe) is adopted, the pipe can be used in various applications including the manufacture of a contact probe (a probe used for an inspection of a semiconductor) having a small diameter that has been difficult to manufacture because of its small outer diameter till now. Further, though a pipe having a small outer diameter is required to possess a certain strength, since a cut mark is formed on the pipe, a user acknowledges that an outer diameter of the pipe is reduced by cutting and hence, anxiety about strength can be alleviated. It is because, in a case where an outer layer is formed by sputtering or plating, usually, an outer layer is thin and the strength of the outer layer is small. On the other hand, if the outer layer of the pipe has the cutting mark, usually, the outer layer is thick and the strength of the outer layer is large.

[15] With respect to the above-mentioned semi-finished pipe (first semi-finished pipe) (for example, [1] to [5]), it is preferable that the first layer and the second layer be made of metals of which the first layer and a portion of the second layer close to the first layer are alloyed with each other by heating the semi-finished pipe.

Alloying means that metal of the first layer and the metal of the second layer are mixed with each other (by thermal diffusion). Alloying means alloying metals of the first layer and the second layer. An alloy is an alloy of metal of the first layer and metal of the second layer. Metal of the first layer and metal of the second layer that are alloyed with each other are not limited to pure metals. They may be metals that contain impurities.

With such a configuration, the first layer can be easily alloyed by heating and is hardened. Further, by such alloying, a portion of the second layer close to the first layer can be also hardened. On the other hand, since an outer side of the second layer is not alloyed or the degree of alloying (alloying ratio) is low (small), cutting it can be performed easily.

[16] With respect to the semi-finished pipe (the first semi-finished pipe) described above (for example, [15]), it is preferable that the first layer be made of palladium or silver, and the second layer be made of copper or iron.

"palladium", "silver", "copper", or "iron" each means metal that forms the main component of the layer. Metal is not limited to metal that is constituted of a single element and also includes even metal that contains impurities.

With such selection of metals for forming the first layer and the second layer, the first layer and the second layer can be easily alloyed with each other.

It is preferable that the semi-finished pipe (first semi-finished pipe) described above (for example, or [16]) further include: a third layer made of metal that is formed on an inner side of the first layer; and an intermediate layer formed between the first layer and the third layer, wherein the intermediate layer is a layer that prevents the metal of the third layer from being alloyed with metal of the first layer and metal of the second layer by heating.

With such formation of the layers, when metal of the first layer and metal of the second layer are alloyed with each other, it is possible to prevent metal of the third layer from also being alloyed together with them.

It is preferable that the third layer be formed of a constitutional material such as metal having smaller thermal conductivity compared to the first layer (more preferably, the first layer and the third layer, further more preferably the first layer, the second layer and the third layer).

Further, the intermediate layer may be made of rare metal. The third layer may be made of rare metal. The third layer may be made of an alloy.

[18] With respect to the semi-finished pipe (first finished pipe) described above (for example, [17]), it is preferable that the intermediate layer be made of nickel.

In a case where the intermediate layer is made of nickel, nickel is metal having small thermal conductivity amongst metals and hence, even when various metals having larger thermal conductivity than nickel are used for forming the third layer, it is possible to prevent metal of the third layer from being alloyed with metal of the first layer (or metals of the first layer and the second layer) by heating. Further, nickel is readily available. The intermediate layer of nickel may be formed by electrolytic plating.

[19] With respect to the semi-finished pipe (first finished pipe) described above (for example, any one of [1] to [4]), it is preferable that the first layer be made of an alloy, and the second layer be made such that a degree of alloying in the second layer is lowered (becomes smaller) in an outward direction.

With such a configuration, the first layer can be hardened. Further, the second layer is made softer in the direction toward the outside (in the direction that fine cutting becomes less necessary) and hence, cutting can be performed easily. On the other hand, the second layer is made harder in the direction opposite to the above-mentioned direction, (in the direction toward the first layer, in the direction that fine cutting becomes more necessary) and hence, it is possible to suppress the occurrence of an error in cutting.

[20] With respect to the semi-finished pipe (the first semi-finished pipe) manufacturing method described above (for example, [8]), it is preferable that, in the step of forming the first layer and in the step of forming the second layer, the first layer and the second layer be formed using metals with which the first layer and a portion of the second layer close to the first layer are alloyed when the semi-finished pipe is heated.

Doing it like this, alloying can be easily performed by heating the semi-finished pipe.

[21] With respect to a pipe manufacturing method for manufacturing a finished pipe from a semi-finished pipe using a lathe of the present invention, it is preferable that it include: a step of preparing the semi-finished pipe (described in any one of [15] to [18], for example); a grasping step of grasping the semi-finished pipe from an outer side of the second layer; a cutting step of cutting the second layer from the outer side of the second layer such that a part of the second layer remains; and an alloying step of alloying the first layer and the remaining second layer by heating the semi-finished pipe.

Doing it like this, in the cutting step, the second layer is cut in a soft state before being alloyed and hence, cutting can be performed easily. Further, in the alloying step, it is possible to form an alloy where the first layer and the remaining second layer are alloyed with each other in a homogenized manner.

In general, since the alloy is harder compared to metal of the first layer and metal of the second layer, if strengths of the finished pipes are same in the following cases, a layer thickness (pipe wall) of the finished pipe, in case where alloying of the first layer and the second layer is performed, can be reduced compared to a case where alloying of the first layer and the second layer is not performed. Also, an outer diameter of the pipe can be made small.

[22] With respect to a pipe manufacturing method for manufacturing a finished pipe from a semi-finished pipe using a lathe of the present invention, it is preferable that it include: step of preparing the semi-finished pipe described in any one of [15] to [18], for example); an alloying step of alloying the first layer and a portion of the second layer close to the first layer by heating the semi-finished pipe; a grasping step of grasping the semi-finished pipe from the outer side of the second layer; and a cutting step of cutting the second layer from the outer side of the second layer down close to the first layer.

By performing such a method, in the cutting step, the second layer becomes softer in the direction toward the outer side the second layer (in the direction that fine cutting becomes less necessary) and hence, the outer side of the second layer can be cut easily. On the other hand, the second layer is made harder in the direction opposite to the above-mentioned direction, (in the direction toward the first layer, in the direction that fine cutting becomes more necessary) and hence, it is possible to suppress the occurrence of an error in cutting the outer periphery of the finished pipe.

In general, since the alloy is harder compared to metal of the first layer and metal of the second layer, if strengths of the finished pipes are same in the following cases, a layer thickness (pipe wall) of the finished pipe, in case where alloying of the first layer and the second layer is performed, can be reduced compared to a case where alloying of the first layer and the second layer is not performed. Also, an outer diameter of the pipe can be made small.

BRIEF DESCRIPTION OF DRAWINGS

FIG. 4 is a view (chart) for describing sizes and the like of the semi-finished pipe 1, the finished pipe 2 and the like according to the embodiment 1.

FIG. 6 is a view (chart) for describing sizes and the like of semi-finished pipes 1, finished pipes 2 and the like according to embodiments 2 to 8.

FIG. 8 is a view (chart) for describing sizes and the like of semi-finished pipes 1, finished pipes and the like according to the embodiments 9 to 11.

FIG. 11 is a view (a chart) for describing sizes and the like of the semi-finished pipes 1, finished pipes 2 and the like according to the embodiments 12 to 16.

DESCRIPTION OF EMBODIMENTS

Hereinafter, a semi-finished pipe, a method for manufacturing a semi-finished pipe, a pipe and a method for manufacturing a pipe according to the present invention are described with reference to FIG. 1A to FIG. 13C. The respective views described hereinafter are schematic views that describe actual shapes, configurations methods, and the like in a simplified manner.

Embodiment 1

A semi-finished pipe 1 (a first semi-finished pipe), a method for manufacturing the semi-finished pipe 1, a pipe (a finished pipe 2) and a method for manufacturing the pipe, according to the embodiment 1 are described with reference to FIG. 1A to FIG. 5. A semi-finished pipe 9 (a second semi-finished pipe) and a method for manufacturing the semi-finished pipe 9 are also described together with the above-description.

[Semi-Finished Pipe 1 and Finished Pipe 2]

Figure 1A:
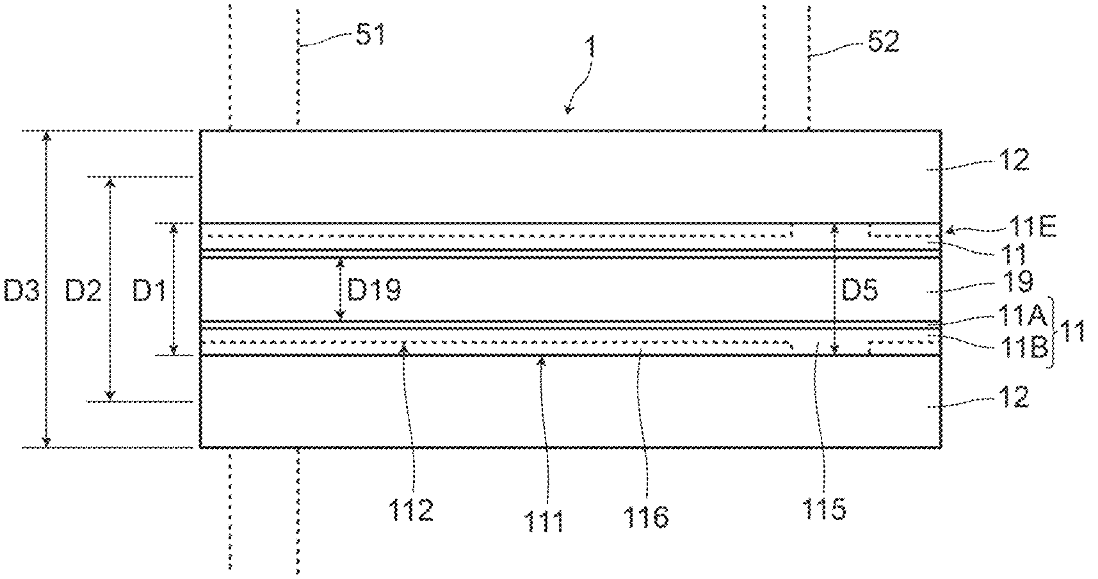
FIG. 1A and FIG. 1B are views for describing a semi-finished pipe 1 (first semi-finished pipe) and a finished pipe 2 according to an embodiment 1.
Figure 1B:
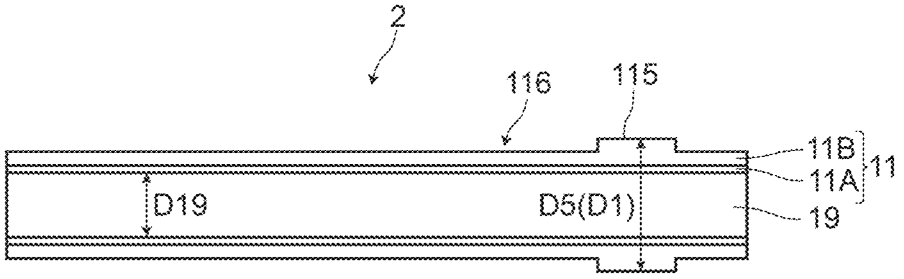

FIG. 1A and FIG. 1B are views for describing a semi-finished pipe 1 (first semi-finished pipe) and a finished pipe 2 according to the embodiment 1. FIG. 1A is a cross-sectional view of the semi-finished pipe 1 in a long axis direction, and FIG. 1B is a view for describing a cross-sectional view of the finished pipe 2 in a long axis direction. The semi-finished pipe 1 and the finished pipe 2 have an approximately circular shape on an outer side in a short axis direction. In this specification, there may be a case where "finished pipe" be simply referred to as "pipe".

As illustrated in FIG. 1A and FIG. 1B, the semi-finished pipe 1 according to the embodiment 1 is the semi-finished pipe 1 before being formed into the finished pipe by cutting performed by a lathe. The semi-finished pipe 1 according to the embodiment 1 includes: a first layer 11 for forming a finished pipe that remains even after cutting performed by the lathe; and a second layer 12 for a dummy use that is formed on the outer side of the first layer 11, and forms an object to be cut by the lathe.

An outer diameter D1 of the first layer 11 of the semi-finished pipe 11 is an outer diameter close to an outer diameter D5 (an outermost diameter) of the finished pipe 2. "Close to" means "substantially same", "near", or the like. That is, "close to" means that the outer diameter D1 is substantially same to D5, and also includes the case where D1 is same to D5. In this embodiment 1, the outer diameter D1 of the first layer 11 is same to the outer diameter D5 of the finished pipe 2. D19 is an inner diameter of the semi-finished pipe 1 or the finished pipe 2, and is same to an outer diameter of a wire 3 described later.

In the above-mentioned semi-finished pipe 1, the first layer 11 has a small outer diameter D1 that makes grasping of the first layer 11 by a chucking jig 51 of the lathe difficult, and the second layer 12 has a large outer diameter D3 that enables grasping of the second layer 12 by the chucking jig 51 of the lathe. An outer diameter D2 in the drawing indicates a minimum diameter that allows grasping by the chucking jig 51. The outer diameters D1, D2, and D3 have the relationship of D1<D2<D3. D5 indicates an outer diameter of the finished pipe 2. In the embodiment 1, the outer diameter D5 of the finished pipe 2 is same to the outer diameter D1 of the first layer 11.

In the above-mentioned semi-finished pipe 1, the outer diameter D1 of the first layer 11 falls within a range from 0.05 mm or more to 0.60 mm or less, and the outer diameter D3 of the second layer 12 has an outer diameter of 0.40 mm or more and 3.00 mm or less.

In the above-mentioned semi-finished pipe 1, the second layer 12 has more favorable machinability than at least a neighboring portion 11E of the first layer 11 close to the second layer 12.

In the above-mentioned semi-finished pipe 1, the first layer 11 includes: a first layer outer layer 11B that forms the neighboring portion 11E with the second layer 12 and; a first layer inner layer 11A that is formed on the inner side of the first layer outer layer 11B. The first layer outer layer 11B has Vicker's hardness that falls within a range of 350 to 550 Hv.

In the embodiment 1, the first layer inner layer 11A is made of a gold cobalt alloy, the first layer outer layer 11B is made of a nickel cobalt layer (Vicker's hardness: 400 to 550 Hv), and the second layer 12 is made of copper (Vicker's hardness: 150 to 230 Hv).

Regarding the semi-finished pipe 1, as illustrated in FIG. 1A and FIG. 1B, the first layer 11 includes the first layer inner layer 11A and the first layer outer layer 11B. The inside of the first layer inner layer 11A is a hollow portion 19. In the first embodiment, the second layer 12 is eliminated by cutting, a portion of the first layer outer layer 11B is cut, and a protruding portion 115 and a recessed portion 116 are formed. Symbol 111 indicates a first layer surface before cutting, symbol 112 indicates a first layer surface after cutting, and a cut mark remains on the first layer surface 112 after cutting.

[Method for Manufacturing Semi-Finished Pipe 1]

Figure 2A:
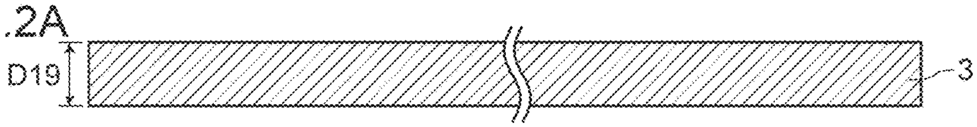
FIG. 2A to FIG. 2F are views for describing a method for manufacturing the semi-finished pipe 1 according to the embodiment 1.
Figure 2B:
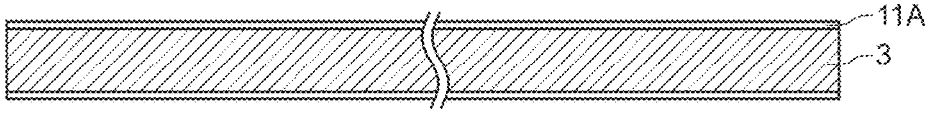
Figure 2C:
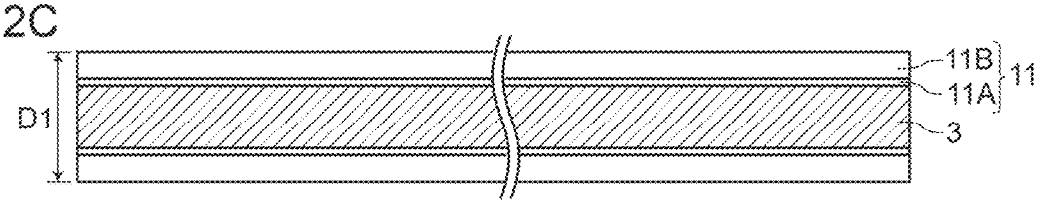
Figure 2D:
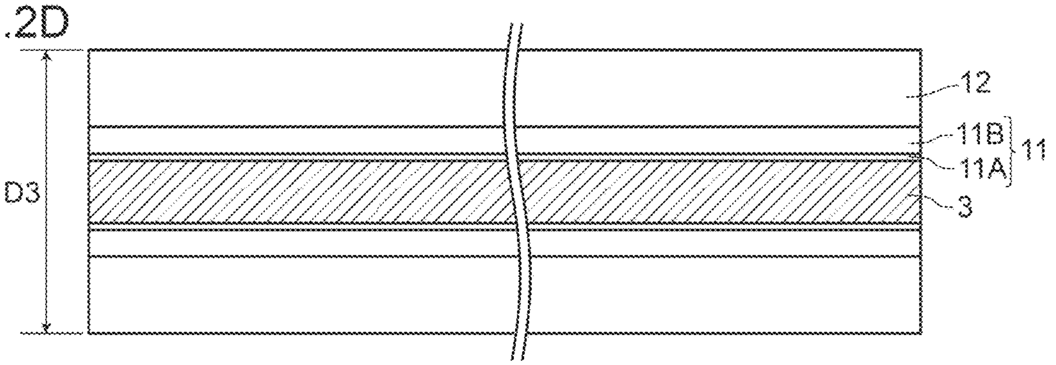

FIG. 2A to FIG. 2F are views for describing a method for manufacturing the semi-finished pipe 1 according to the embodiment 1. FIG. 2A to FIG. 2F are views for describing the steps of the method. As illustrated in FIG. 2A to FIG. 2F, the method for manufacturing the semi-finished pipe 1 according to the embodiment 1 is the method for manufacturing the semi-finished pipe 1 before the finished pipe 2 is formed by cutting performed by a lathe. The method for manufacturing the semi-finished pipe 1 according to the embodiment includes: a step of preparing the wire 3 (FIG. 2A); a step of forming the first layer 11 for the finished pipe (FIG. 2B and FIG. 2C); and a step of forming the second layer 12 for a dummy use that becomes an object to be cut by the lathe on an outer side of the first layer 11 (FIG. 2D).

To describe more specifically, first, a stainless steel wire (wire member) 3 having a diameter (the outer diameter, D19) of 0.20 mm is prepared (FIG. 2A). "stainless steel wire" is a wire obtained by forming stainless steel into a wire shape. Stainless steel is an alloy steel that contains iron (Fe) as a main component, and also contains 1.2% (percent concentration by mass) or less of carbon and 10.5% or more of chromium.

Then, on the wire 3 (stainless steel wire), the first layer inner side layer 11A made of a gold cobalt alloy (thickness: 1 μm), is formed by electrolytic plating (FIG. 2B). On the outer side of the first layer inner side layer 11A, the first layer outer layer 11B (the outer diameter D1: 0.25 mm), made of a nickel cobalt alloy (thickness: 24 μm), is formed by electrolytic plating (FIG. 2C). In this manner, the first layer 11, that constitutes the finished pipe having the first layer inner layer 11A and the first layer outer layer 11B, is formed on the wire 3.

Then, on the outer side of the first layer 11, the second layer 12 (outer diameter D3: 1.25 mm) is made of copper (thickness: 500 μm) is formed by electrolytic plating (FIG. 2D). The second layer 12 is a layer for a dummy use that becomes an object to be cut by a lathe.

Figure 2E:
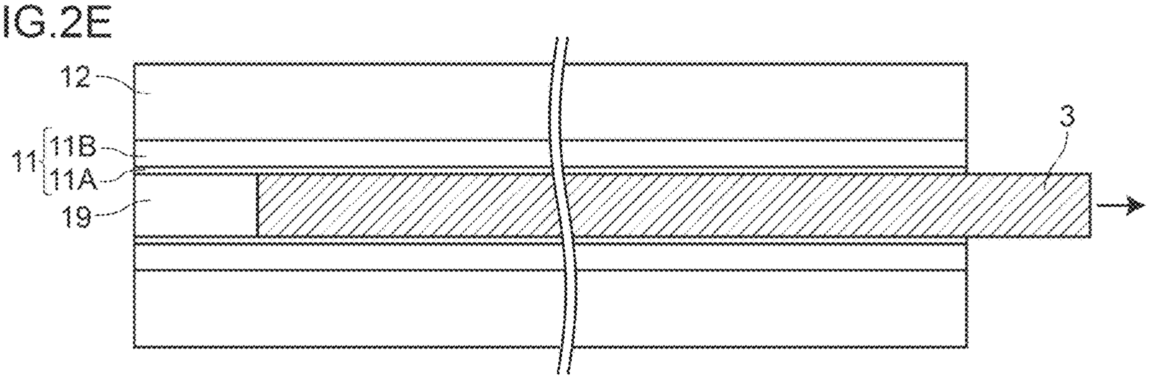

Then, the wire 3 is removed by pulling (FIG. 2E).

Figure 2F:
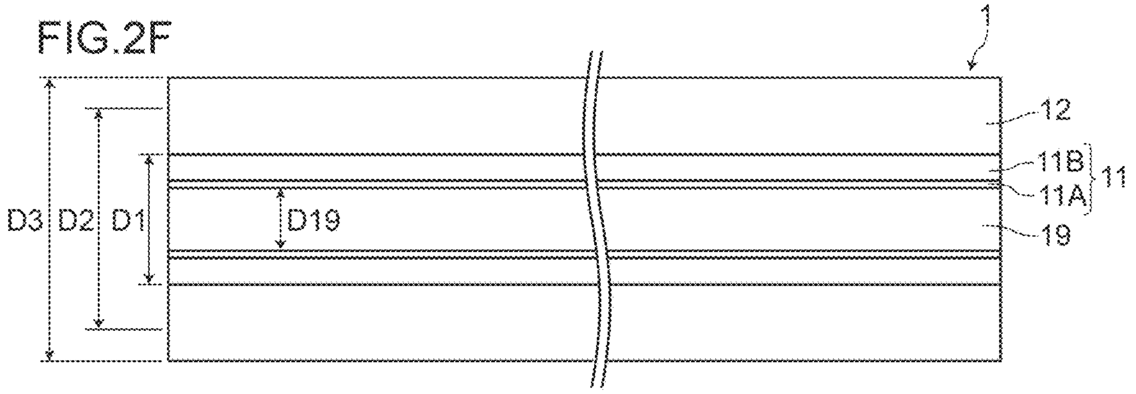

In FIG. 2F, the semi-finished pipe 1 (inner diameter D19, outer diameter D3), that is manufactured through the above-mentioned steps illustrated in FIG. 2A to FIG. 2E, is illustrated.

[Method of Manufacturing Finished Pipe 2]

Figure 3A:
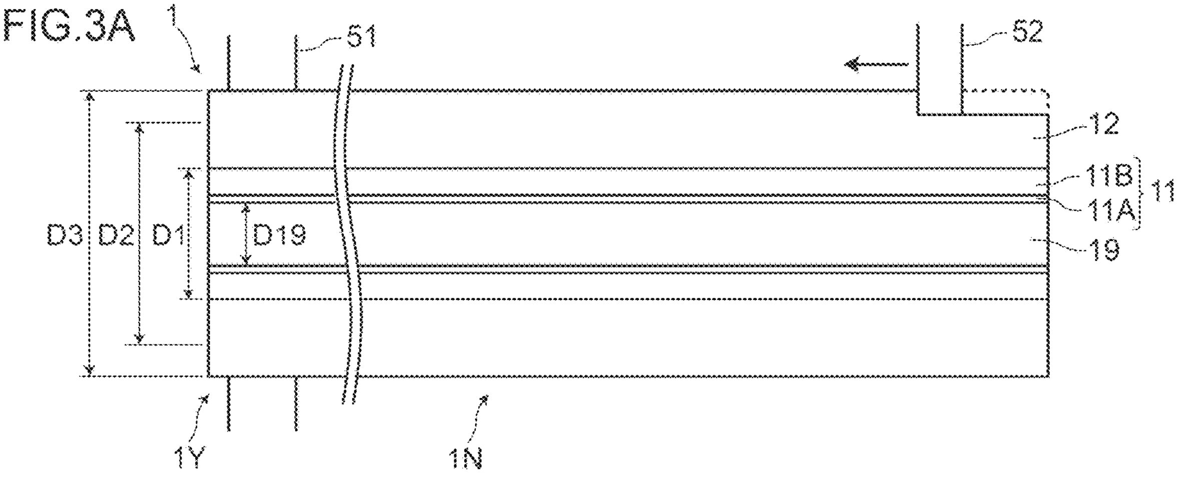
FIG. 3A to FIG. 3D are views for describing a method for manufacturing a finished pipe 2 according to the embodiment 1.
Figure 3B:
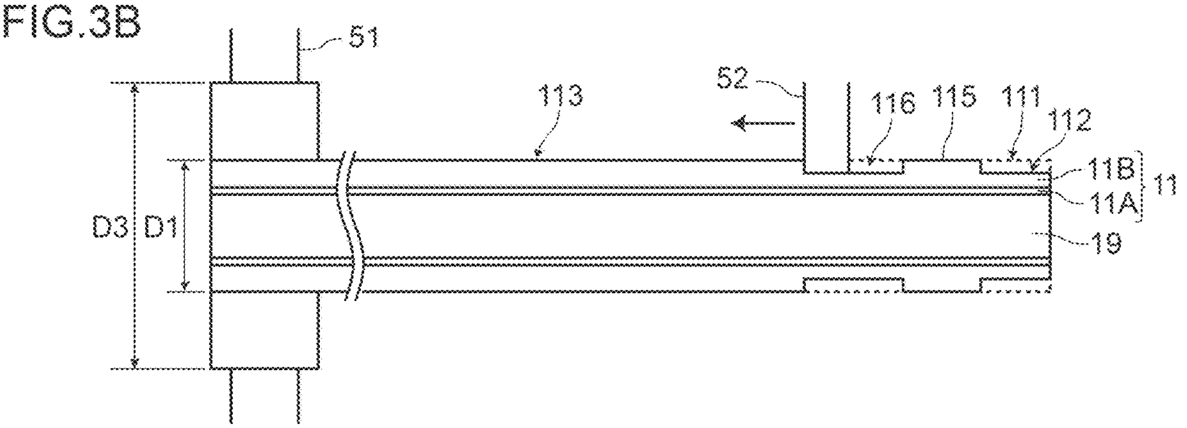
Figure 3C:
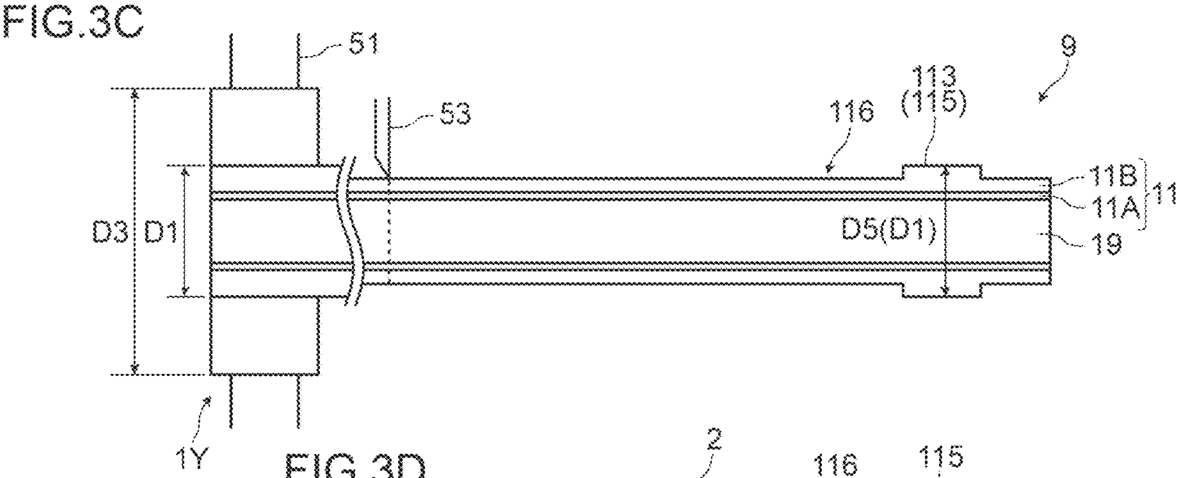

FIG. 3A to FIG. 3D are views for describing a method for manufacturing the finished pipe 2 according to the embodiment 1. FIG. 3A to FIG. 3D are views for describing steps of the manufacturing method. As illustrated in FIG. 3A to FIG. 3D, the method for manufacturing the finished pipe 2 according to the embodiment 1 is a pipe manufacturing method that manufactures the finished pipe 2 from the semi-finished pipe 1 using the lathe. The method includes: a step of preparing the above-mentioned semi-finished pipe 1 (FIG. 3A); a grasping step of grasping the semi-finished pipe 1 from the outer side the second layer 12 (FIG. 3A); a cutting step of forming a recessed portion 116 or a protruding portion 115 on the predetermined portion of the first layer 11 by cutting the second layer 12 at the portion other than grasped portion 1N from the outer side of the second layer 12 (FIG. 3B); and a cutting-off step of cutting off (separating by cutting) a grasped portion 1Y (a dummy layer stacking portion) (FIG. 3C).

To describe more specifically, first, the semi-finished pipe 1 for manufacturing the finished pipe 2 is prepared (FIG. 3A). The semi-finished pipe 1 is a pipe described in FIG. 1A and FIG. 1B and the like.

Then, the semi-finished pipe 1 is grasped by the chucking jig 51 such as a collet from the outer side the second layer 12 (FIG. 3A). The size of an outer diameter D3 of the second layer 12 is formed for enabling the chucking jig 51 to grasp the second layer 12. The step of preparing the semi-finished pipe 1 and the grasping step of grasping the semi-finished pipe 1 are collectively described in FIG. 3A.

Then, avoiding the portion 1Y that is grasped by the chucking jig 51, the second layer is cut, at the portion IN other than grasped, by a cutting jig 52 such as a cutting tool or the like from the outside thus forming a recessed portion 116 or the protruding portion 115 at a predetermined portion of the first layer 11 (FIG. 3B). A cutting depth is 0.01 mm. The portion of the first layer 11, that is cut in a thickness direction (short axis direction), forms the recessed portion 116, and the portion, that is not cut, forms the protruding portion 115. As a manner of forming the recessed portion 116 or the protruding portion 115, the following methods are exemplified. As the first forming method, the recessed portion 116 or the protruding portion 115 is formed by sequentially cutting the second layer 12 and a predetermined portion of the first layer 11, while moving the cutting jig 52 in the long axis direction of the semi-finished pipe 1 relative to the semi-finished pipe 1. The other method is adapted where the recessed portion 116 or the protruding portion 115 is formed on the first layer 11 within a range of a predetermined length after performing cutting the second layer 12 for a predetermined length in the long axis direction of semi-finished pipe 1.

Then, while grasping the semi-finished pipe 1, the cut portion is cut off by a cutting jig 53 such as a cut-off cutting tool (FIG. 3C). When a length of the finished pipe 2 is short such as 1 mm to 5 mm, and a length of the semi-finished pipe 1 is long such as 1 m to 1.5 m, the semi-finished pipe 1 is cut off each length, corresponding to the length of the finished pipe 2, from an end portion opposite to the grasped portion 1Y.

Figure 3D:
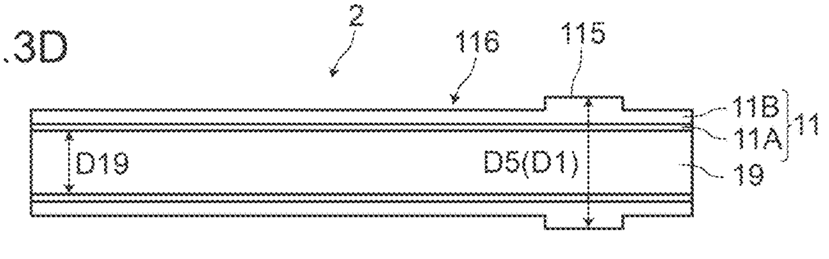

FIG. 3D illustrates the finished pipe 2 manufactured through steps shown in FIG. 3A to FIG. 3C.

FIG. 4 is a view (chart) for describing sizes and the like of the semi-finished pipe 1, the finished pipe 2 and the like according to the embodiment 1. In FIG. 4, wire 3 (core wire), first layer 1, second layer 12, finished pipe 2, their materials, thicknesses, outer diameters D and the like are listed.

"Machinability" in FIG. 4 indicates the degree of machinability, that is difficult to be cut, against pure nickel. "good" indicates that the machinability is good, and "excellent" indicates that the machinability is excellent. In a case where the finished pipe 2 has the protruding portion, the outer diameter D5 of the finished product 2 is an outer diameter including the protruding portion.

With respect to the description of the content or the like, for example, "Au—Co alloy (Co: 0.1% to 1.0%)" means that, in a gold cobalt alloy, the content (a weight ratio) of cobalt is 0.1% to 1.0% and the residual content is gold. However, there may be a case where the gold cobalt alloy may contain minor additives. The same goes for the description of other alloys (The above description applies to FIGS. 6 and 8 as well).

[Second Semi-Finished Pipe 9]

The semi-finished pipe 1 (first semi-finished pipe) described heretofore is the semi-finished pipe in a state before the second layer 12 is cut. However, the semi-finished pipe, in a state where the second layer 12 is already cut and before the semi-finished pipe 1 is cut off at the predetermined portion, may be a semi-finished pipe 9 (second semi-finished pipe). (see FIG. 3C).

[Second Semi-Finished Pipe 9]

The method is a semi-finished pipe manufacturing method for manufacturing a second semi-finished pipe 9 (second semi-finished pipe), from the semi-finished pipe (the first semi-finished pipe 1), further closer to a finished pipe 2 from a finished pipe using a lathe. This method for manufacturing the semi-finished pipe incudes: a step of preparing the above-mentioned semi-finished pipe (first semi-finished pipe 1); a grasping step of grasping the semi-finished pipe (the first semi-finished pipe) from the outer side of the second layer 12; a cutting step of forming a recessed portion 116 or a protruding portion 115 on the first layer 11 by cutting from an outer side of the second layer 12; and a step of forming the second semi-finished pipe 9 in a state where the grasped portion 1Y and a portion on which the recessed portion 116 or the protruding portion 115 is formed are connected to each other.

The manufactured semi-finished pipe (second semi-finished pipe 9) is a semi-finished pipe used for manufacturing a finished pipe 2 by cutting a predetermined portion of the semi-finished pipe. The manufactured semi-finished pipe includes: a dummy layer stacking portion where a first layer 11 for forming the finished pipe and a second layer 12 for a dummy use formed on an outer side of the first layer 11 are stacked to each other; and a first layer unevenness forming portion where a recessed portion 116 or a protruding portion 115 is formed. That is, since the recessed portion 116 or the protruding portion 115 is formed on an outer side, if it is cut (cut off) at the predetermined portion, it is possible to manufacture the finished pipe 2.

A pipe manufacturing method for manufacturing the pipe (the finished pipe 2) using this second semi-finished pipe 9 includes: a step of preparing the above-mentioned semi-finished pipe (the second semi-finished pipe 9); a grasping step of grasping the semi-finished pipe (the second semi-finished pipe 9) at the dummy layer stacking portion 1Y; and a cutting-off step of cutting off the first layer unevenness forming portion from a dummy layer stacked side.

[Finished Pipe 2]

The finished pipe 2 according to the embodiment 1 illustrated in FIG. 3D and the like is made of metal, has an outer diameter D5 of 0.05 mm or more and less than 0.60 mm, has the recessed portion 116 or the protruding portion 115 on an outer periphery thereof, and has a cut mark on the cut portion.

[Example of Use of Finished Pipe 2]

Figure 5:
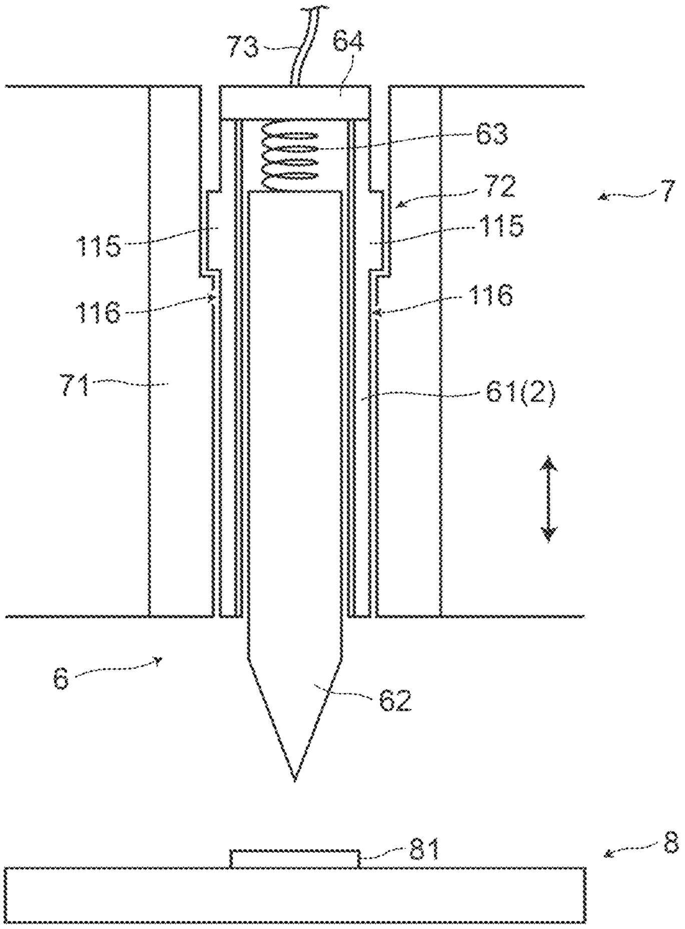
FIG. 5 is a view for describing an example of use of the finished pipe 2 according to the embodiment 1.

FIG. 5 is a view for illustrating the use example of the finished pipe 2 according to the embodiment 1. That is, FIG. 5 illustrates the use example where the finished pipe 2 according to the embodiment 1 is applied to a semiconductor inspection device 7.

In this use example, the finished pipe 2 is used as a barrel 1 (a sleeve) of a contact probe 6 in which a plunger 62 and a spring 61 are disposed. A spring fixture 64 is disposed on an upper portion of the barrel 61, and a spring 63 is mounted on the spring fixture 64. The contact probe 6 is housed in the contact probe fixture 71 of the semiconductor inspection device 7 with the convex portion 115 of the final product tube 2 (barrel 61) fitted into the fitting portion 72 of the semiconductor inspection device 7. The plunger 62 contacts or does not contact the electrode 81 of the semiconductor element 8 by moving the contact probe 6 up and down as indicated by the arrow in the drawing. When the plunger 62 contacts the electrode, the plunger 62 contacts with moderate pressure due to the elastic force of the spring 63. Signals to and from the electrodes 81 can be sent or received via the wiring conductors 73 to test the semiconductor.

Advantageous Effects Acquired by Embodiment 1

According to the semi-finished pipe 1 of the embodiment 1, the second layer 12 that is used as a dummy and becomes an object to be cut by a lathe is formed on the outer side of the first layer 11 for forming the finished pipe 2. So, even if the outer diameter is small and it is difficult to grip with a chucking jig and to cut using a lathe, it is possible to provide a semi-finished pipe 1 for manufacturing a pipe having a small outer diameter (finished product pipe 2) having a recessed portion or the protruding portion on a surface thereof, by grasping the second layer 12 which is used as a dummy.

Further, the outer diameter D1 of the first layer 11 is an outer diameter close to an outer diameter D5 of the finished pipe 2 and hence, it is possible to provide the semi-finished pipe 1 that facilitates cutting of the second layer 12 that is used as a dummy and formation of the recessed portion 116 or the protruding portion 115 on the surface of the first layer 11.

Further, even when the first layer 11 has a small outer diameter D1 that makes grasping of the semi-finished pipe by a chucking jig 51 of the lathe difficult, the second layer 12, on the outer side of the first layer 11, has a large outer diameter D2 that enables grasping of the semi-finished pipe by the chucking jig of the lathe. SO, it is possible to provide the semi-finished pipe 1 which can be easily cut with a lathe. By grasping the second layer 12 with a chucking jig.

With respect to the semi-finished pipe 1 according to the embodiment 1, though the outer diameter D1 of the first layer 11 is small such as 0.05 mm or more and less than 0.60 mm and it is difficult to grasp the first layer 11, it is possible to perform cutting of the semi-finished pipe 1, since the second layer 12, having the outer diameter D3 of 0.40 mm or more and 3.00 mm or less, is formed on an outer side of the first layer 11.

Further, the second layer 12 has more favorable machinability than at least the neighboring portion 11E of the first layer 11 close to the second layer 12 and hence, the second layer 12 for a dummy can be easily cut.

Further, the first layer 11 includes: the first layer outer layer 11B that forms the neighboring portion 11E close to the second layer 12; and the first layer inner layer 11A that is formed inside the first layer outer layer 11B and Vicker's hardness of the first layer outer layer falls within a range of 350 to 550 Hv. So while the first layer outer layer 11B cannot be easily cut by a lathe, the first layer outer layer 11B can be cut by a lathe. For example, it is also possible to form a function-forming layer (a layer that imparts good conductivity, etc.) for the final product pipe 2 on the first layer inner layer 11A and protect it with the hard first layer outer layer 11B formed on the outer side.

The method for manufacturing the semi-finished pipe 1 according to the embodiment 1 (the semi-finished pipe 1 used for forming the finished pipe 2 by cutting performed using the lathe) includes: the step of preparing the wire 3; the step of forming the first layer 11 forming the finished pipe 2 that remains even after cutting performed by a lathe on an outer peripheral side of the wire 3; and the step of forming the second layer 12 for a dummy use that becomes an object to be cut by the lathe on an outer peripheral side of the first layer. So, even if the outer diameter is small and it is difficult to grip with a chucking jig and to cut using a lathe, it is possible to provide a semi-finished pipe 1 for manufacturing a pipe having a small outer diameter (finished product pipe 2) having a recessed portion 116 or the protruding portion 115 on a surface thereof.

The method for manufacturing a pipe (the method for manufacturing a pipe that manufactures the finished pipe 2 from the semi-finished pipe 1 using a lathe) according to the embodiment 1 includes: the step of preparing the semi-finished pipe 1; the grasping step of grasping the semi-finished pipe 1 from the outer side of the second layer 12; the cutting step of forming a recessed portion or a protruding portion on the first layer by cutting from the outer side of the second layer 12; and the cutting-off step of cutting off a predetermined portion of the semi-finished pipe.

So, even if the outer diameter is small and it is difficult to grip with a chucking jig and to cut using a lathe, it is possible to manufacture a pipe (finished product pipe 2) having a small outer diameter (finished product pipe 2) with a recessed portion 116 or the protruding portion 115 on a surface thereof.

According to the method for manufacturing the semi-finished pipe 9 (the method for manufacturing a pipe that manufactures the second semi-finished pipe 9 closer to the finished pipe 2 from the semi-finished pipe 1) includes: the step of preparing the semi-finished pipe 1; the grasping step of grasping the semi-finished pipe 1 from the outer side of the second layer 12; the cutting step of forming a recessed portion 116 or a protruding portion 115 on the first layer 11 by cutting from the outer side of the second layer 12; and the step of forming the second semi-finished pipe 9 in a state where the grasped portion 1Y and the portion on which the recessed portion 116 or the protruding portion 115 is formed are connected to each other. Accordingly, it becomes possible to manufacture the second semi-finished pipe 9 close to the finished pipe 2.

The semi-finished pipe 9 (the semi-finished pipe 9 used for forming the finished pipe 2 by cutting the predetermined portion) according to the embodiment 1 includes: the dummy layer stacking portion where the first layer 11 for forming the finished pipe and the second layer 12 for a dummy use that is formed on the outer of the first layer 11 are stacked to each other; and the first layer unevenness forming portion where the recessed portion 116 or the protruding portion 115 is formed. Accordingly, it is possible to provide the finished pipe 2 by grasping the dummy layer stacking portion and by cutting off the predetermined portion of the first layer unevenness forming portion.

According to the method for manufacturing a pipe (the method for manufacturing a pipe that manufactures the finished pipe 2 from the second semi-finished pipe 9) of the embodiment 1 includes: the step of preparing the semi-finished pipe 9 (the second semi-finished pipe); the grasping step of grasping the semi-finished pipe 9 at the dummy layer stacking portion; and the cutting-off step of cutting off the first layer unevenness forming portion from the dummy layer stacked side. Accordingly, the finished pipe 2 can be easily manufactured from the second semi-finished pipe 9.

According to the pipe (finished pipe 2) of the embodiment 1, even if it has been difficult to manufacture the contact probe 6 since the outer diameter is small, it becomes possible to manufacture the contact probe 6 (see FIG. 5). Further, since there is a cutting mark, it can be seen that it was manufactured by cutting rather than sputtering or plating, and it can be used without worrying about strength and the like.

Embodiments 2 to 8

FIG. 6 is a view (a flowchart) for describing the sizes and the like of semi-finished pipes 1, finished pipes 2 and the like, according to the embodiments 2 to 8. In FIG. 6, wires 3, materials, thicknesses, outer diameters D and the like of first layers 11, second layers 12, finished pipes 2 are described.

The pipes (the semi-finished pipes 1, 9, the finished pipe 2) and the methods of manufacturing the pipes, according to the embodiments 2 to 8, are basically the same as the corresponding pipes and the corresponding methods according to the embodiment 1. However, as shown in FIG. 6, the embodiments 2 to 8 differ from the embodiment 1 with respect to materials that form the pipes and the like.

That is, in the embodiments 2 to 8, a first layer inner layer 11A is made of any one of gold, a gold-cobalt alloy, palladium, a palladium alloy or an eutectoid of polytetrafluoroethylene and nickel. A first layer outer layer 11B is made of any one of a nickel cobalt alloy, a nickel manganese alloy or pure nickel, and a second layer 12 is made of any one of copper, pure nickel or a nickel manganese alloy.

With respect to materials, the sizes and the like of the first layer, the second layer and the like of the embodiments 2 to 8, it is assumed that the contents described in FIG. 6 are described in the specification, and it is omitted to describe the contents of the description in FIG. 6 in the form of sentences (the same being applicable to the above-mentioned FIG. 4 and FIG. 8 described later).

Advantageous Effects Acquired by the Embodiments 2 to 8

By using members made of appropriate materials for the first layer inner layer 11A, the first outer layer 11B, and the second layer 12, it becomes easier to provide a method that can manufacture a pipe that has a recessed portion or a protruding portion on a surface thereof and such a pile, even if the outer diameter is small and it is difficult to grip with a chucking jig and to cut using a lathe.

Further, the semi-finished pipe is formed of: the first layer inner layer 11A that ensures (exhibits) the functional property of the pipe (semi-finished pipe): the first layer outer layer 11B that protects it, and the outer layer 11B that can be cut by performing cutting using a lathe, and the materials suitable for the respective layers can be properly selected.

For example, in a case where the first layer inner layer 11A is formed using gold (pure gold), the pipe can exhibit functions such as favorable electricity conductive property, favorable rust prevention property, softness and the like.

In a case where the first layer inner layer 11A is formed using a gold-cobalt alloy, the pipe can be hardened compared to the pipe where the first layer inner layer 11A is formed using gold, and can exhibit functions such as favorable electricity conductive property, favorable rust prevention property and the like.

In a case where the first layer inner layer 11A is formed using palladium, the pipe exhibits a hydrogen occlusion property that occludes hydrogen, a catalyst function that removes harmful substances in an exhaust gas from an automobile and the like.

In a case where the first layer inner layer 11A is formed using a palladium alloy, the pipe can exhibit a biological safety function, a wear resistance function and the like besides a hydrogen occlusion property and a catalyst function. As the palladium alloy, for example, there are an alloy which contains silver as a main content and to which palladium is added for preventing sulfurization of silver, an alloy to which gold is further added to the above-mentioned contents for acquiring corrosion resistance, or a 12% gold/silver palladium alloy and the like. The 12% gold/silver palladium alloy is an alloy which contains 12% of gold, 20% of palladium, and a balance which is formed of approximately 50% of silver, approximately 20% of copper, indium and the like.

A eutectoid of polytetrafluoroethylene (PTFE) and nickel can exhibit a sliding property, a lubrication property and the like. This is because when a surface of the first layer inner layer 11 is worn away, new PTFE particles appear so that a low friction coefficient can be maintained. PTFE is a polymer of tetrafluoroethylene and is a fluororesin (fluorocarbon resin) which contains only fluorine atoms and carbon atoms.

In a case where the first layer outer layer 11B is formed using either a nickel-cobalt alloy or a nickel-manganese alloy, the first layer outer layer 11B is hard and hence, the first layer outer layer 11B can protect the first layer inner layer 11A. The first layer outer layer 11B can be cut by a lathe and a recessed portion or a protruding portion can be formed on the first layer outer layer 11B.

In a case where the second layer 2 is formed using either copper or pure nickel, the pipe can be grasped and can have the favorable machinability.

By adopting the above-mentioned combination of materials described above as the materials for forming the first layer inner layer 11A, first layer outer layer 11B and the second layer 12, these layers can be easily formed by stacking.

With respect to the points other than the contents described in the embodiments 2 to 6, the configuration, the method, the advantageous effects and the like described in the embodiment 1 can be applied as they are.

Embodiments 9 to 11

Figure 7:
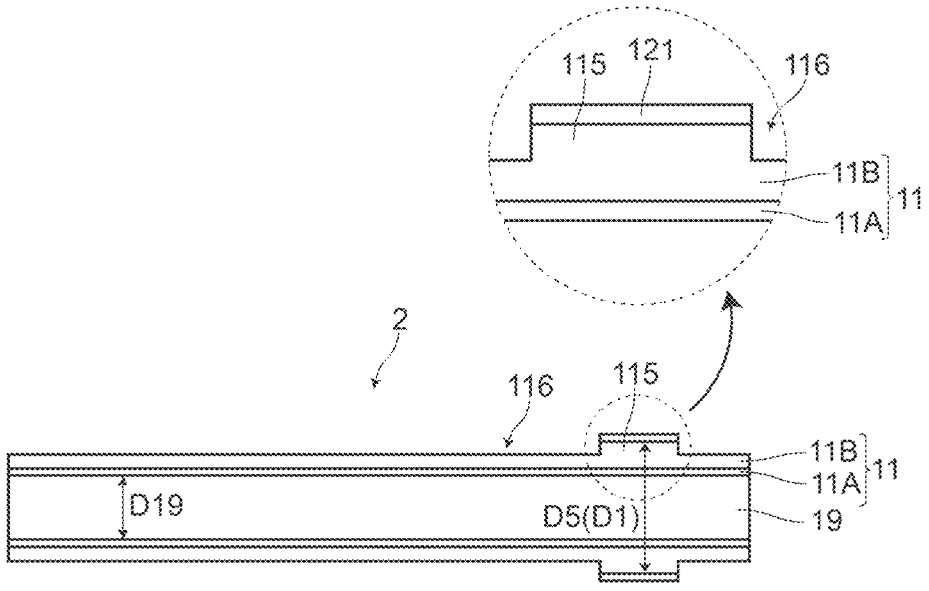
FIG. 7 is a view for describing embodiments 9 to 11.

FIG. 7 is a view (a cross-sectional view) for describing embodiments 9 to 11.

FIG. 8 is a view (chart) for describing sizes and the like of semi-finished pipes 1, finished pipes 2 and the like according to the embodiments 9 to 11.

The configurations of the semi-finished pipes 1, 9, the finished pipes 2 and the like according to the embodiments 9 to 11 and the method for manufacturing these pipes are substantially same to the configuration of the corresponding pipes and the method of the corresponding method according to the embodiment 1. However, as illustrated in FIG. 7 (FIG. 8), the configurations of the semi-finished pipes 1, 9, the finished pipes 2 and the like according to the embodiments 9 to 11 or the method for manufacturing these pipes differs from the configuration of the corresponding pipes or the method of the corresponding method according to the embodiment 1 with respect to a point that a part of the second layer 12 remains on the semi-finished pipe 9 or the finished pipe 2 even after the second layer 12 is cut. Symbol 121 indicates the part of the second layer 12 which remains after performing cutting (see FIG. 7, FIG. 8). In a case where a surface of the portion of the second layer 12 is cut, a cut mark remains at a cut portion.

To describe the method for manufacturing the pipe (the finished pipe 2) in the embodiments 9 to 11, the manufacturing method is basically same to the manufacturing method described in the embodiment 1. However, the manufacturing method differs from the manufacturing method described in the embodiment 1 with respect to a point that, in a case of manufacturing the finished pipe 2 (or the second semi-finished pipe 9) from the semi-finished pipe (the first semi-finished pipe 1), the second layer 12 is cut such that the part 121 of the second layer 12 remains in a cutting step of cutting the second layer 12.

To explain in conjunction with the embodiment 9, materials, layer thicknesses, outer diameters and the like of the first layer 11 and the second layer 12 and, further, the method for manufacturing these layers are basically same to the materials, the layer thicknesses, the outer diameters and the like of the corresponding first and second layers 11, 12 and the corresponding manufacturing method of the embodiment 1. However, in forming the finished pipe 2 (or the second semi-finished pipe 9) from the first semi-finished pipe 1), the cutting is performed such that the part 121 of the second layer 12 remains (see FIG. 7 and FIG. 8). With respect to the finished pipe 2 (or the second semi-finished pipe 9), in the embodiment 1, the entity of the second layer 12 is cut, and the first layer 11 is cut such that the protruding portion 115 or the recessed portion 116 is formed in a state where an outer diameter (an outermost diameter) of the first layer 11 becomes 0.25 mm. On the other hand, in the embodiment 9, the second layer 12 is cut such that the part 121 remains (such that the part 121 having a thickness of 50 μm remains at an upper portion of the protruding portion 115). By performing such a cutting step, the outer diameter (the outermost diameter) of the finished pipe 2 (or the second semi-finished pipe 9) becomes 0.27 mm that is larger than an outer diameter of the first layer of 0.25 mm. The protruding portion 115 or the recessed portion 116 is formed on the first layer 11.

The embodiment 10 is an embodiment slightly modifying the embodiment 9. The embodiment 10 is same to the embodiment 9 with respect to the materials of the first layer 11 and the second layer 12 and a thickness of a first layer inner layer. However, the embodiment 10 differs from the embodiment 9 with respect to a thickness of a second layer 12 before cutting, and a thickness of a part 121 of a second layer that remains even after cutting is performed. Further, the embodiment 10 differs from the embodiment 9 with respect to an outer diameter of the finished pipe 2 (or the second semi-finished pipe 9). However, the embodiment 10 is substantially same to the embodiment 9 with respect to the point that there is the part 121 of the second layer that remains even after cutting is performed.

The embodiment 11 is an embodiment that differs from some points of the embodiment 9 with respect to materials, layer thicknesses and outer diameters of the first layer 11 and the second layer 12 as well as the thickness of the part 121 of the second layer that remains even after cutting is performed and a portion of the outer diameter of the finished pipe 2 (or the second semi-finished pipe 9) (see FIG. 8). However, the embodiment 11 is substantially same to the embodiment 9 with respect to the point that there is the part 121 of the second layer 12 that remains even after cutting is performed.

Advantageous Effects Acquired by Embodiments 9 to 11

In this way, in a case where the finished pipe 2 (or the second semi-finished pipe 9) is manufactured from the semi-finished pipe (the first semi-finished pipe 1), by cutting the second layer 12 such that a part of the second layer 12 remains in the cutting step of cutting the second layer 12, it is possible to have effects such as the easy adjustment of the height of the protruding portion 115, forming a surface of the protruding portion 115 into either a soft surface or a hard surface, the further enhancement of sealing property and the like.

With respect to the points other than the contents described in the embodiments 9 to 11, the configuration, the method, the advantageous effects and the like described in the embodiment 1 can be also applied to the embodiments 9 to 11.

Embodiments 12 to 16

The embodiments 12 to 16 are basically substantially same to the embodiment 1. However, the embodiments 12 to 16 differ from the embodiment 1 with respect to a point that the first layer 11 and a portion of the second layer 12 are used as constitutional components of the finished pipe 2 in an alloyed state.

Embodiment 12

The embodiment 12 is described hereinafter. Both of FIG. 9A to FIG. 10D are views for describing the embodiment 12. FIG. 9A to FIG. 9D are the view for describing a method for cutting after alloying is performed, and FIG. 10A to FIG. 10D are views for describing a method for cutting before alloying. FIG. 11 is a view (a chart) for describing sizes and the like of semi-finished pipes 1, finished pipes 2 and the like according to the embodiments 12 to 16. In FIG. 11, metal& such as "Pg", "Ag" and "Ni" described as constitutional materials are materials whose main components are these elements. The metals are not limited to pure metals. Each metal may contain impurities.

[Method for Cutting after Alloying (See FIG. 9A to FIG. 9D)]

Figure 9A:
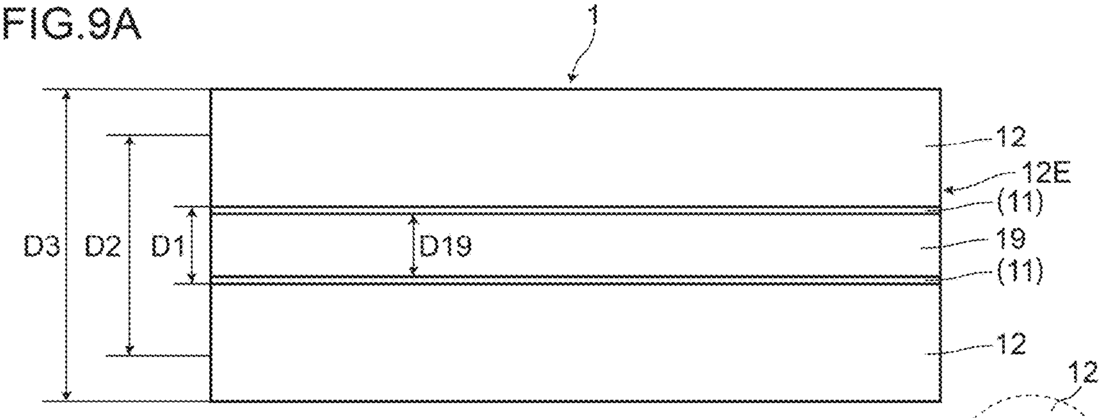
FIG. 9A to FIG. 9D are views for describing an embodiment 12 (a method for cutting after alloying).

In a method for cutting after alloying, first, a semi-finished pipe 1 (a first semi-finished pipe) is prepared (see FIG. 9A). A constitutional material of a wire material 3 (not illustrated in the drawing) that is used for forming a hollow portion 19 (an inner diameter D19: 0.200 mm, see FIG. 11 with respect to other sizes) is stainless steel. A constitutional material of a first layer 11 (layer thickness: 2 μm) is palladium and is formed by electrolytic plating (outer diameter D1: 0.204 mm). A constitutional material of a second layer 12 (layer sickness: 523 μm) is copper and is formed by electrolytic plating (outer diameter D3: 1.250 mm). Symbol 12E indicates a neighboring portion of the second layer 12 close to the first layer.

The pipe, from which the wire 3 (not illustrated in the drawing) is pulled out and removed, becomes the semi-finished pipe 1.

Figure 9B:
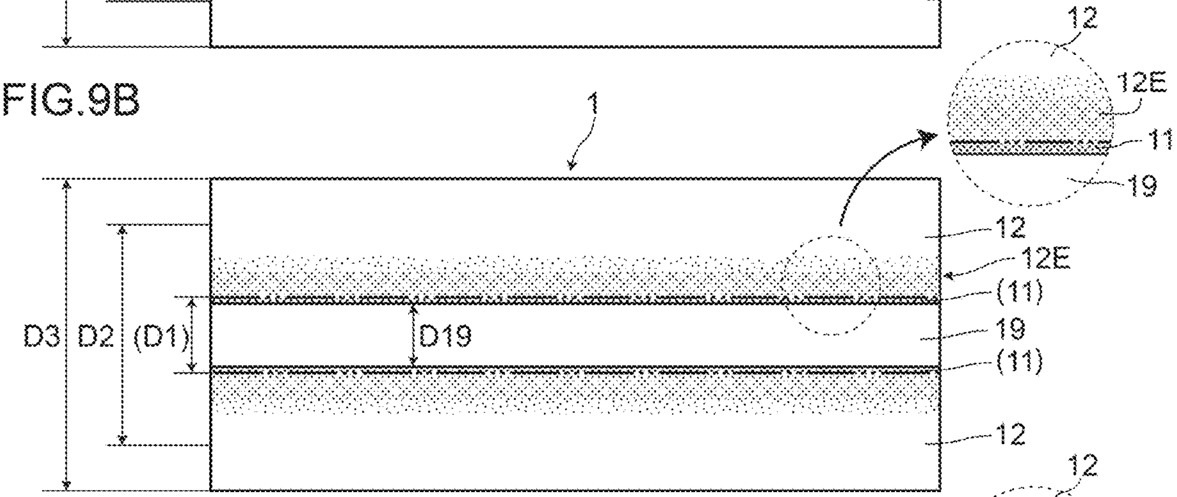

Next, the semi-finished pipe 1 is conveyed into a heating furnace and is heated (FIG. 9B). The semi-finished pipe 1 is heated at a temperature of 400° C. to 500° C. for example. As a result, the first layer 11 (palladium) and the portion 12E (copper) of the second layer 12 close to the first layer are alloyed by thermal diffusion (copper-palladium alloy). The second layer 12 has a higher degree of alloying as it approaches the first layer 11, and a lower degree of alloying as it moves away from it. The degree of alloying can be changed by heating time or temperature.

Figure 9C:
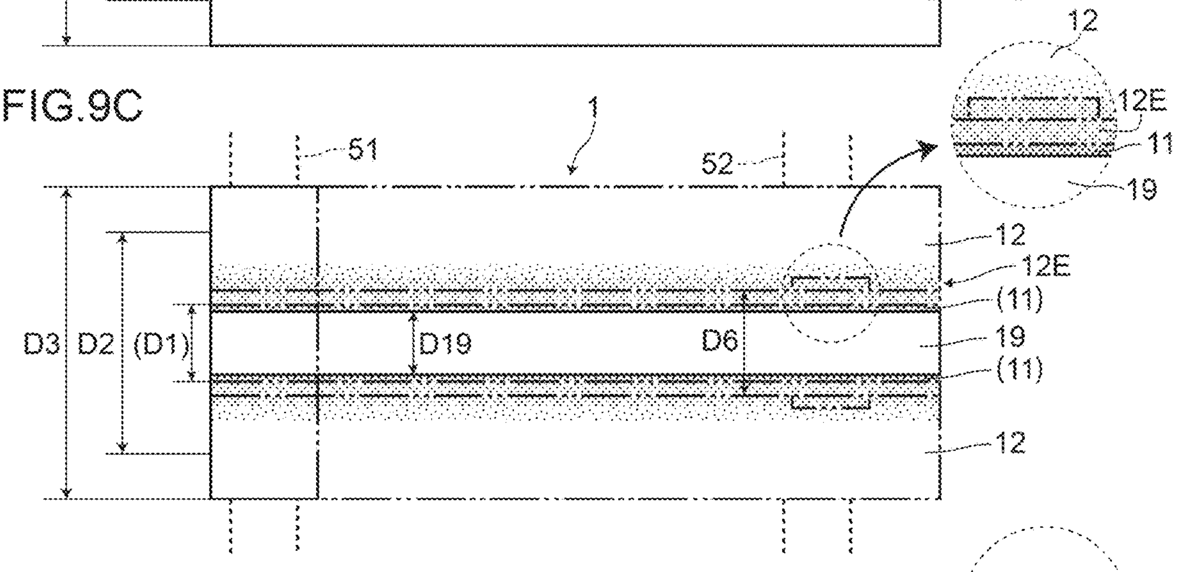

Next, the semi-finished pipe 1 is cut (see FIG. 9C). For example, end portions (one end portion or both end portions) of the semi-finished pipe 1 in the long axis direction is/are grasped by the chucking jig(s) 51, and the semi-finished pipe 1 is cut by a cutting jig 52 such that the second layer 12 (copper) has a predetermined outer diameter D6 (0.220 mm). In such a cutting step, a protruding portion (see FIG. 9D) or a recessed portion (not illustrated in the drawing) may be formed. Even when a protruding portion or a recessed portion is formed, it is only a partial portion, and is generally cut so as to have a predetermined outer diameter D6 (0.220 mm). Then, a portion of the semi-finished pipe 1, that is grasped by the chucking jig 51, is cut off by a cutting jig for cut-off tool (not illustrated in the drawing). If the length of the final product pipe 2 is short, such as 1 to 5 mm, and the length of the semi-finished pipe 1 is long, such as 1 to 1.5 m, then the semi-finished pipe 1 is cut off with the length of the final product pipe 2 one by one.

Figure 9D:
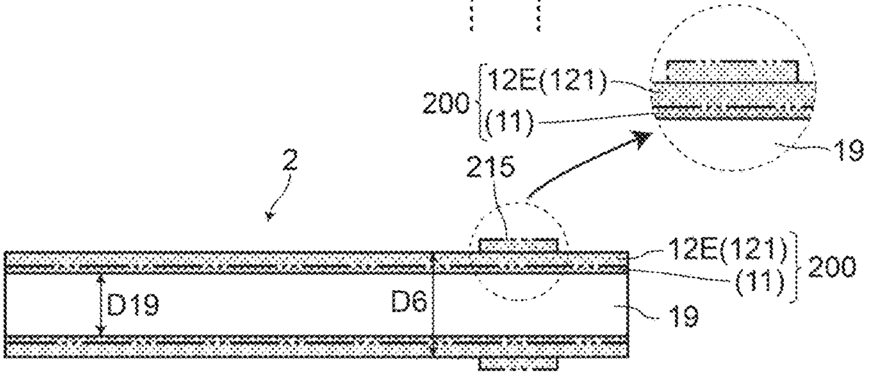

The finished pipe 2 is manufactured in this way (see FIG. 9D). Symbol 111 indicates an alloy layer (a copper-palladium alloy layer) formed by alloying the first layer (palladium) and a portion of the second layer (copper) close to the first layer.

In case that the second layer 12 (copper) is cut while leaving a portion of a layer thickness of 8 μm where the degree of alloying is high, an alloy layer 200 (a copper-palladium alloy) becomes an alloy layer where copper (8 μm) and palladium (2 μm) are alloyed at a ratio of approximately 8:2 (see the view or the chart illustrated in FIG. 11, with respect to a layer thickness, an outer diameter D6 of the finished pipe 2 and the like).

[Method for Alloying after Performing Cutting (see FIG. 1*a*A to FIG. 10D)]

Figure 10A:
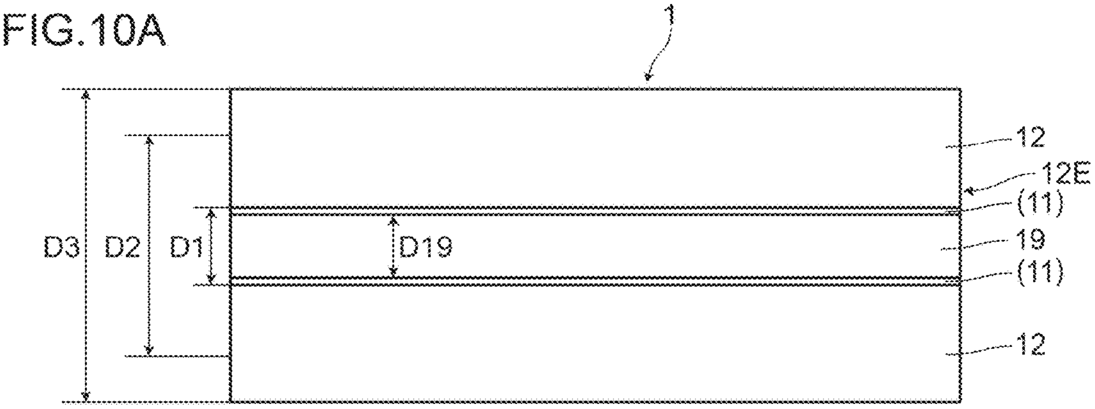
FIG. 10A to FIG. 10D are views for describing the embodiment 12 (a method for cutting before alloying).

First, in the same manner as the method for cutting after alloying (see FIG. 9A), the semi-finished pipe 1 (the first semi-finished pipe) is prepared (see FIG. 10A).

(The semi-finished pipe 1 is formed by pulling out and removing the wire 3 (not illustrated in the drawing).

Figure 10B:
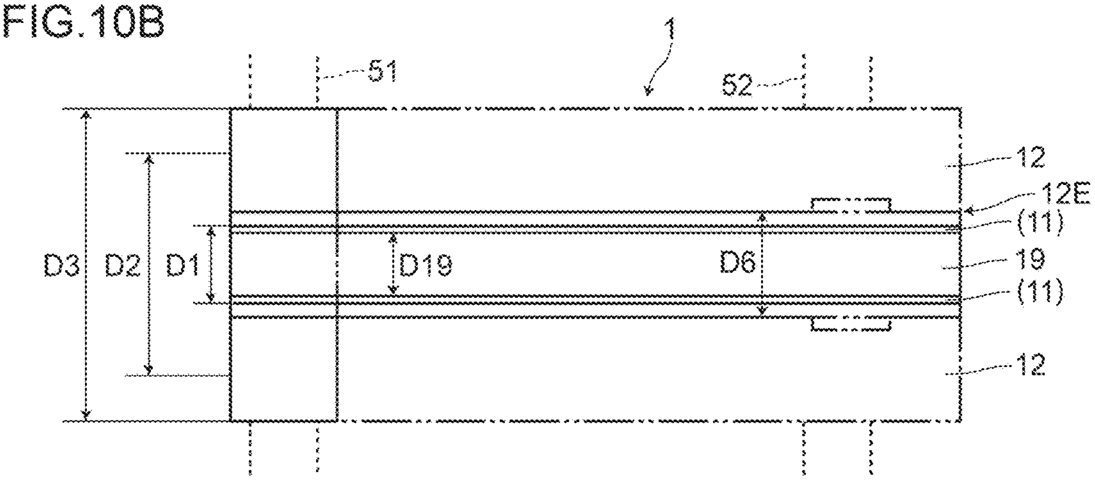

Next, the semi-finished pipe 1 is cut (see FIG. 10B). For example, end portions (one end portion or both end portions) of the semi-finished pipe 1 in the long axis direction is/are grasped by the chucking jig(s) 51, and the semi-finished pipe 1 is cut by a cutting jig 52 such that the second layer 12 (copper) has a predetermined outer diameter D6 (0.220 mm). In such a cutting step, a protruding portion (see the drawing) or a recessed portion (not illustrated in the drawing) may be formed. Even when a protruding portion or a recessed portion is formed, it is only a partial portion, and is generally cut so as to have a predetermined outer diameter D6 (0.220 mm).

Then, a portion of the semi-finished pipe 1, that is grasped by the chucking jig 51, is cut off by a cutting jig for cut-off tool (not illustrated in the drawing). If the length of the final product pipe 2 is short, such as 1 to 5 mm, and the length of the semi-finished pipe 1 is long, such as 1 to 1.5 m, then the semi-finished pipe 1 is cut off with the length of the final product pipe 2 one by one. As a result, the cut-off pipe has the shape of the finished pipe 2.

Alternatively, the portion, that is grasped by the chucking jig 51, is left without being cut off (the portions, other than the portion grasped by the chucking jig 51, is formed into an outer shape of the finished pipe 2).

Figure 10C:
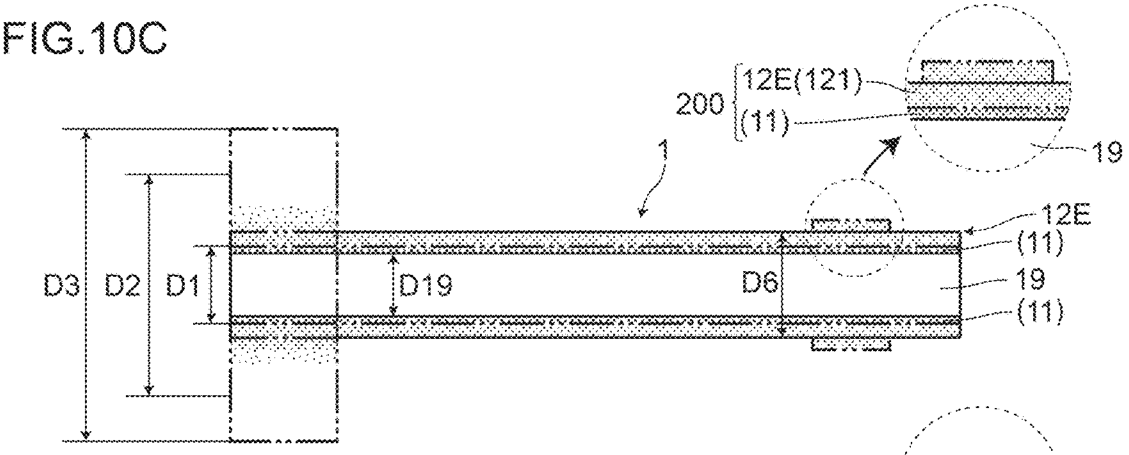

Next, the semi-finished pipe 1 after performing cutting the second layer 12 is conveyed into a heating furnace and is heated (see FIG. 10C). As a result, the first layer 11 (palladium) and the first portion 12E of the second layer 12 (copper) close to the first layer are alloyed by thermal diffusion so that the alloy layer 200 (a copper-palladium alloy layer) is formed.

When the second layer 12 (copper) is cut while leaving the layer thickness of 8 μm, the alloy layer 200 (the copper-palladium alloy layer: 10 μm) becomes an alloy layer in which copper (8 μm) and palladium (2 μm) are almost uniformly alloyed at a ratio of approximately 8:2.

When the portion of the semi-finished pipe 1 grasped by the chucking jig 51 is cut off so that the semi-finished pipe 1 is cut into the shape of the finished pipe 2, the cut-off pipe becomes the finished pipe 2 having the alloy layer 200 (see FIG. 10D) as it is.

On the other hand, the portion of the semi-finished pipe 1 that is grasped by the chucking jig 51 is not cut off and remains, the finished pipe 2 having the alloy layer 200 is obtained by cutting off such a portion (see the chart in FIG. 11 with respect to the layer thickness, the outer diameter D6 and the like of the finished pipe 2). Symbol 215 indicates the protruding portion when the protruding portion is formed.

The pipe between the pipe illustrated in FIG. 9A and the pipe illustrated in FIG. 9D (for example, the pipe illustrated in FIG. 9B or FIG. 9C) may be the semi-finished pipe 1 to be traded.

Figure 10D:
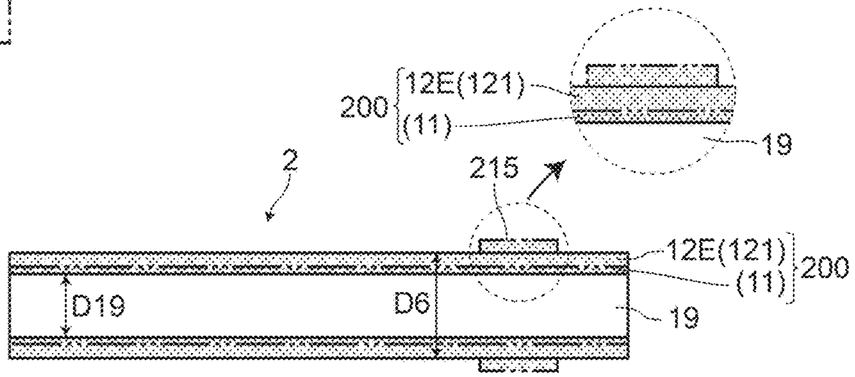

Further, the pipe between the pipe illustrated in FIG. 1*a*A and the pipe illustrated in FIG. 10D (for example, the pipe illustrated in FIG. 10B or FIG. 10C) may be the semi-finished pipe 1 to be traded.

Embodiment 13

Basically, the embodiment 13 is substantially same to the embodiment 12. However, the embodiment 13 differs from the embodiment 12 with respect to a point that the first layer 11 of the semi-finished pipe 1 is formed of a first layer inner layer 11A (silver) and a first layer outer layer 11B (palladium), the second layer 12 is formed of copper, and an alloy layer of the finished pipe 2 is formed of a copper-silver-palladium alloy layer (see FIG. 11).

That is, on an outer side of the wire 3, the first layer inner layer 11A (silver, 1 μm), the first layer outer layer 11B (palladium, 1 μm) and the second layer 12 (copper, 523 μm) are formed in a stacked manner by electrolytic plating.

Then, the semi-finished pipe 1 is formed by pulling out and removing the wire 3 (not illustrated in the drawing).

By heating the semi-finished pipe 1, the first layer inner layer 11A (silver) and the first layer outer layer 11B (palladium) are alloyed with the second layer 12 (copper) thus manufacturing the finished pipe 2 having an alloyed layer (copper-silver-palladium alloy having a thickness of 10 μm, the ratio of copper:silver:palladium is approximately 8:1:1 (see the chart illustrated in FIG. 11 with respect to a layer thickness, an outer diameter D6 and the like of the finished pipe 2).

Embodiment 14

The embodiment 14 is basically substantially same to the embodiment 12. However, the embodiment 14 differs from the embodiment 12 with respect to a point that the semi-finished pipe 1 has a stacked structure formed by stacking a third layer (a gold-cobalt alloy layer, not illustrated in the drawing), an intermediate layer (a nickel layer, not illustrated in the drawing), a first layer 11 (a palladium layer) and a second layer 12 (a copper layer), and the finished pipe 2 has a stacked structure formed of a third layer (a gold-cobalt alloy layer), an intermediate layer (a nickel layer) and an alloy layer (a copper-palladium alloy layer) from the inside to the outside (see FIG. 11).

Although the third layer and the intermediate layer are layers formed inside the first layer 11 and are not the first layer 11, they are shown in the column of the first layer 11 in FIG. 11 for convenience.

That is, on an outer side of the wire 3, the third layer (a gold-cobalt alloy layer, 1 μm), the intermediate layer (a nickel layer, 1 μm) the first layer 11 (a palladium layer, 2 μm) and the second layer 12 (a copper layer, 188.5 μm) are formed in a stacked manner by electrolytic plating.

Then, the semi-finished pipe 1 is formed by pulling out and removing the wire 3 (not illustrated in the drawing).

By heating the semi-finished pipe 1, the first layer 11 (the palladium layer) is alloyed with the second layer 12 (the copper layer) thus manufacturing the finished pipe 2 having the stacked structure formed of the third layer (the gold-cobalt alloy layer, 1 μm), the intermediate layer (the nickel layer, 1 μm) and an alloy layer (the copper-palladium alloy layer, 10.5 μm, the ratio of copper:palladium is approximately 8.5:2) (see the chart in FIG. 11 with respect to the layer thickness, the outer diameter D6 and the like of the finished pipe 2).

As described above, nickel has a lower thermal conductivity than palladium, so when the metal of the first layer is alloyed with the metal of the second layer, it can prevent the metal of the third layer from being alloyed together.

Embodiment 15

Basically, the embodiment 15 is substantially same to the embodiment 12. However, the embodiment 15 differs from the embodiment 12 with respect to a point that the semi-finished pipe 1 has a stacked structure, from inner side to outer side, formed by stacking a third layer (a gold-cobalt alloy layer, not illustrated in the drawing), an intermediate layer (a nickel layer, not illustrated in the drawing), a first layer inner layer 11A (a silver layer), a first layer outer layer 11B (a palladium layer), and a second layer 12 (a copper layer), and the finished pipe 2 has a stacked structure formed of the third layer (a gold-cobalt alloy layer), the intermediate layer (a nickel layer) and an alloy layer (a copper-silver-palladium alloy layer) (see FIG. 11).

That is, outer side the wire 3, the third layer (the gold-cobalt alloy layer, 1 μm), the intermediate layer (the nickel layer, 1 μm), the first layer inner layer 11A (the silver layer, 3 μm), the first layer outer layer 11B (the palladium layer, 3 μm) and the second layer 12 (the copper layer, 202 μm) are formed in a stacked manner by electrolytic plating.

Then, the semi-finished pipe 1 is formed by pulling out and removing the wire 3 (not illustrated in the drawing).

By heating the semi-finished pipe 1, the first layer inner layer 11A (the silver layer) and the first layer outer layer 11B (the palladium layer) are alloyed with the second layer 12 (the copper layer) thus manufacturing the finished pipe 2 having the stacked structure formed of the third layer (the gold-cobalt alloy layer, 1 μm), the intermediate layer (the nickel layer, 1 μm) and an alloy layer (the copper-silver-palladium alloy layer, 18 μm, the ratio of copper:silver:palladium is approximately 12:3:3) (see the chart in FIG. 11 with respect to the layer thickness, the outer diameter D6 and the like of the finished pipe 2).

As described above, nickel has a lower thermal conductivity than silver (or silver and palladium), so when the metal of the first layer is alloyed with the metal of the second layer, it can prevent the metal of the third layer from being alloyed together.

Embodiment 16

Basically, the embodiment 16 is substantially same to the embodiment 12. However, the embodiment 16 differs from the embodiment 12 with respect to a point that the semi-finished pipe 1 has a stacked structure, from inner side to outer side, formed by stacking a third layer (a gold-nickel alloy layer, not illustrated in the drawing), an intermediate layer (a nickel layer, not illustrated in the drawing), a first layer 11 (a palladium layer) and a second layer 12 (a copper layer) and the finished pipe 2 has a stacked structure formed of the third layer (the gold-nickel alloy layer), the intermediate layer (the nickel layer) and the alloy layer (a copper-palladium alloy layer) (see FIG. 11).

That is, outer side the wire 3, the third layer (the gold-nickel alloy layer, 2 μm), the intermediate layer (the nickel layer, 1 μm), the first layer 11 (the palladium layer, 3 μm) and the second layer 12 (the copper layer, 251 μm) are formed in a stacked manner by electrolytic plating.

Then, the semi-finished pipe 1 is formed by pulling out and removing the wire 3 (not illustrated in the drawing).

By heating the semi-finished pipe 1, the first layer 11 (the palladium layer) is alloyed with the second layer 12 (the copper layer) thus manufacturing the finished pipe 2 having the stacked structure formed of the third layer (the gold-nickel alloy layer, 2 μm), the intermediate layer (the nickel layer, 2 μm) and an alloy layer (the copper-palladium alloy layer, 7 μm, the ratio rate of copper:palladium is approximately 4:3 (see the chart in FIG. 11 with respect to the layer thickness, the outer diameter D6 and the like of the finished pipe 2).

As described above, nickel has a lower thermal conductivity than palladium, so when the metal of the first layer is alloyed with the metal of the second layer, it can prevent the metal of the third layer from being alloyed together.

Although copper (Cu) is used for the second layer 12 in Embodiments 12 to 16 described above, copper may be replaced with iron (Fe).

If iron is replaced with copper, the constituent material of the second layer 12 of Embodiment 12 shown in FIG. 11 is iron, and the alloy of the constituent material of the finished pipe 2 is iron-palladium alloy. The constituent material of the second layer 12 of Embodiment 13 is iron, and the alloy of the constituent material of the finished pipe 2 is iron-silver-palladium alloy. The constituent material of the second layer 12 of Embodiment 14 is iron, and the alloy (outer layer) of the constituent material of the finished pipe 2 is iron-palladium alloy. The constituent material of the second layer 12 of Embodiment 15 is iron, and the alloy (outer layer) of the constituent material of the finished pipe 2 is iron-silver-palladium alloy. The constituent material of the second layer 12 of Embodiment 16 is iron, and the alloy (outer layer) of the constituent material of the finished pipe 2 is iron-palladium alloy. Other points (constituent materials, sizes, etc.) shown in FIG. 11 remain unchanged.

Summary of Embodiments 12 to 16 (Constitutions, Methods)

The constitutions and the methods of the above-mentioned embodiments 12 to 16 are summarized as follows.

In the semi-finished pipe 1 (first semi-finished pipe), the first layer 11 and the second layer 12 (a portion of the second layer, the portion 12E close to the first layer) can be made of materials of which the first layer 11 and the second layer 12 (the portion 12E of the second layer 12 close to the first layer) are alloyed to each other by heating the semi-finished pipe 1 (FIG. 9A to FIG. 11).

It is preferable that the semi-finished pipe 1 (the first semi-finished pipe) be formed such that the first layer 11 is made of palladium or silver, and the second layer 12 is made of copper or iron (see FIG. 11).

As examples (constitutional materials) of the combinations of the first layer 11 and the second layer 12, for example, the combinations such as palladium/copper, palladium/iron, silver/copper, silver/iron, silver palladium/copper, and silver palladium/iron are included.

"Palladium", "silver", "copper", or "iron" means that a metal of such element is a main component. They are not limited to "pure metal". They may contain impurities.

Such a semi-finished pipe 1 can be formed such that the semi-finished pipe 1 further includes: a third layer made of metal that is formed on an inner side of the first layer 11; and an intermediate layer formed between the first layer 11 and the third layer. The intermediate layer is a layer that prevents the metal of the third lay from being alloyed with metal of the first layer 11 and metal of the second layer 12 by heating.

It is preferable that the third layer be a layer having smaller thermal conductivity than the first layer 11, (further preferably the first layer 11 and the third layer, and still further preferably the first layer 11, the second layer 12 and the third layer). Further, the intermediate layer may be formed using rare metal. The third layer may be formed using rare metal. The third layer may be formed using an alloy.

Such an intermediate layer may be made of nickel (formed using nickel). With respect to thermal conductivity [W/m K] of metal at a pressure of 1 atm and at a temperature of 20° C., thermal conductivity of nickel (99.2%) is 59. Such thermal conductivity of nickel is smaller than thermal conductivity of silver (silver: 418), or thermal conductivity of palladium (palladium: 70).

Such a semi-finished pipe 1 may be formed such that, for example, as in the case of the semi-finished pipe 1 illustrated in FIG. 9B, the first layer 11 is made of an alloy, and the second layer 12 is made such that a degree of alloying in the second layer is lowered in an outward direction.

In the method for manufacturing a semi-finished pipe described above (for example[8]), the semi-finished pipe may be manufactured such that, in the step of forming the first layer 11 and in the step of forming the second layer 12, the first layer 11 and the second layer 12 are formed using metals with which the first layer 11 and the portion (12E) of the second layer 12 close to the first layer are alloyed when the semi-finished pipe 1 is heated (see FIG. 9A to FIG. 10D and the like).

Further, as described with reference to FIG. 10A to FIG. 10D, as the pipe manufacturing method for manufacturing the finished pipe from the semi-finished pipe using a lathe, the pipe manufacturing method may include: the step of preparing the above-described semi-finished pipe 1 (for example, any one of [15] to [18]); the grasping step of grasping the semi-finished pipe 1 from the outer side of the second layer 12; the cutting step of cutting the second layer 12 from the outer side of the second layer 12 by cutting such that a part of the second layer 12 remains; and the alloying step of alloying the first layer 11 and the remaining second layer 12 (121) by heating the semi-finished pipe 1.

Further, as the pipe manufacturing method for manufacturing the finished pipe from the semi-finished pipe using a lathe, as described with reference to FIG. 9A to FIG. 9D, the pipe manufacturing method may include: the step of preparing the semi-finished pipe 1 according to the above-mentioned embodiment (for example, any one of [15] to [18]); an alloying step of alloying the first layer 11 and the portion 12E of the second layer 12 close to the first layer by heating the semi-finished pipe 1; the grasping step of grasping the semi-finished pipe 1 from the outer side the second layer 12; and the cutting step of cutting the second layer 12 from the outer side of the second layer 12 such that the second layer 12 is cut down to the portion 12E of the second layer 12 close to the first layer.

Advantageous Effects Acquired by Embodiments 12 to 16

As described in the embodiments 12 to 16, the semi-finished pipe 1 (the first semi-finished pipe) is formed such that, the first layer 11 and the second layer 12 (a portion of the second layer, the portion 12E close to the first layer of which the first layer 11 and the second layer 12 (the portion 12E of the second layer 12 close to the first layer) are alloyed to each other by heating the semi-finished pipe 1 (FIG. 9A to FIG. 11). Accordingly, the first layer 11 can be easily alloyed and hardened. Further, the portion of the second layer 12 close to the first layer can be also alloyed and hardened. On the other hand, an outer side of the second layer 12 is not alloyed or the degree of alloying is low and hence, cutting can be performed easily.

If the semi-finished pipe 1 (first semi-finished pipe) is formed such that the first layer 11 is made of palladium or silver, and the second layer 12 is made of copper or iron, the first layer 11 and the second layer 12 can be easily alloyed.

Such a semi-finished pipe 1 can be formed such that the semi-finished pipe 1 further includes: a third layer made of metal that is formed on an inner side of the first layer 11; and an intermediate layer formed between the first layer 11 and the third layer. The intermediate layer is a layer that prevents, by heating, the metal of the third lay from being alloyed with metal of the first layer 11 and metal of the second layer 12. With such a configuration, when the metal of the first layer 11 and the metal of the second layer 12 are alloyed with each other, it is possible to prevent the metal of the third layer from being alloyed together with metal of the first layer 11 and the metal of the second layer 12.

Further, in the case where the intermediate layer is made of nickel (the intermediate layer being formed using nickel), nickel is metal having small thermal conductivity among metals and hence, if various metals having larger thermal conductivities than nickel are used as the metal of the third layer, it is possible to prevent the metal of the third layer from being alloyed with the metal or metals of the first layer 11 (or the first layer 11 and the second layer 12). Further, nickel is easily obtainable and the layer can be easily formed by electrolytic plating or the like.

In the case where the semi-finished pipe 1, is formed such that the first layer 11 is made of an alloy and the second layer 12 is made such that a degree of alloying in the second layer is lowered in an outward direction. (see Fig. (b)), it is possible to harden the first layer 11. Further, the second layer 12 is formed softer in the outward direction (the direction that does not require precise cutting) and hence, cutting can be performed easily. On the other hand, cutting mistakes can be suppressed, since the second layer 12 is harder in the direction opposite to the outward direction (the direction toward the first layer 11, the direction that requires precise cutting).

In the semi-finished pipe manufacturing method described above (for example [8]), if, in the step of forming the first layer 11 and in the step of forming the second layer 12, the first layer 11 and the second layer 12 are formed using metals with which the first layer 11 and the portion (12E) of the second layer 12 close to the first layer are alloyed when the semi-finished pipe 1 is heated, the semi-finished pipe 1 can be easily alloyed by heating the semi-finished pipe 1.

Regarding the pipe manufacturing method for manufacturing the finished pipe from the semi-finished pipe using a lathe, if the method is a pipe manufacturing method that includes: the step of preparing the semi-finished pipe 1 described above (for example, any one of [15] to [18]); the grasping step of grasping the semi-finished pipe 1 from the outer side of the second layer 12; the cutting step of cutting the second layer 12 by cutting from the outer side of the second layer 12 by cutting such that a part of the second layer 12 remains; and the alloying step of alloying the first layer 11 and the remaining second layer 12 (121) by heating the semi-finished pipe 1 (see FIG. 10A, to FIG. 10D), cutting can be easily performed, since, in the cutting step, the second layer 12 is cut in a soft state before being alloyed. Further, in the alloying step, it is easy to make the first layer 11 and the remaining second layer 12 (121) uniform alloy.

Further, by performing such alloying, the alloyed metal can be made harder than metal of the first layer 11 and the metal of the second layer 12, and a layer thickness (a pipe wall) of the finished pipe 2 can be reduced. Further it is also possible to reduce a pipe outer diameter D6.

Regarding the pipe manufacturing method for manufacturing the finished pipe from the semi-finished pipe using a lathe, if the method is a pipe manufacturing method that includes: the step of preparing the semi-finished pipe 1 described above (for example, any one of [15] to [18]); the alloying step of alloying the first layer 11 and the portion 12E of the second layer 12 close to the first layer 11 by heating the semi-finished pipe 1; the grasping step of grasping the semi-finished pipe 1 from the outer side the second layer 12; and the cutting step of cutting the second layer 12 by cutting from the outer side the second layer 12 such that the second layer 12 is cut down to the portion 12E of the second layer 12 close to the first layer (see FIG. 9A to FIG. 9D), it is easy to cut the outer side of the second layer 12 in the cutting step, since it is softer toward the outer side of the second layer 12 (the direction that does not require precise cutting). On the other hand, cutting mistakes of the outer side of the finished pipe 2 can be suppressed, since the second layer 12 is harder in the direction opposite to the outward direction (the direction toward the first layer 11, the direction that does not require precise cutting).

Further, by performing such alloying, the alloyed metal can be made harder than metal of the first layer 11 and the metal of the second layer 12, and a layer thickness (a pipe wall) of the finished pipe 2 can be reduced. Further it is also possible to reduce a pipe outer diameter D6.

With respect to the points other than the contents described in the embodiments 12 to 16, the modes such as the configuration, the method, the advantageous effects and the like described in the embodiment 1 or the embodiments 2 to 11 are directly applicable also to the embodiment 1 or the embodiments 12 to 16.

Modifications

Although the present invention has been described with reference to the embodiments described above, the present invention is not limited to the above-mentioned embodiments, and the present invention can be modified without departing from the gist of the present invention. For example, the following modifications are conceivable.

(1) In the above-mentioned embodiment 1, the recessed portion 116 is formed by cutting a wide area of a surface 113 exposed on the first layer 11, and the protruding portion 115 is formed in a remaining narrow area. However, a ratio that the recessed portion 116 or the protruding portion 115 occupies, the shape of the protruding portion 115 or the recessed portion 116, the method of forming the recessed portion 116 or the protruding portion 115 and the like are not limited to the above-mentioned forming method.

Figure 12:
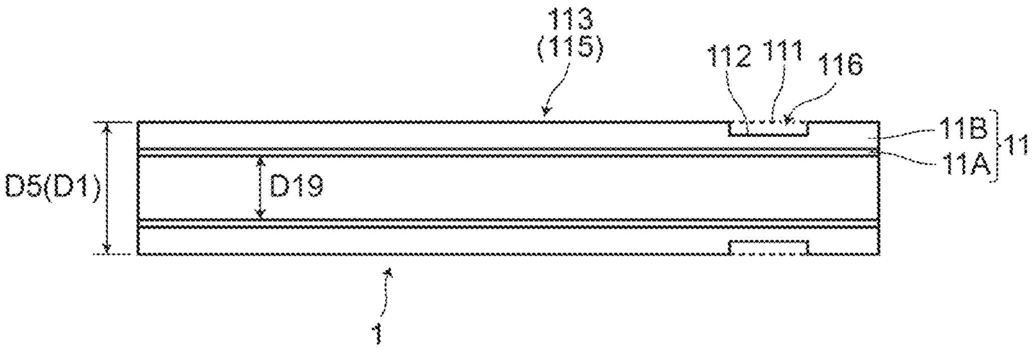
FIG. 12 is a view foe describing a modification of cutting of a first layer 11.

FIG. 12 is a view for describing a modification of cutting of the first layer 11. As illustrated in FIG. 12, the recessed portion 116 may be formed by cutting a narrow area of a portion of the surface 113 exposed on the first layer 11 so as to make the rate that the area of the protruding portion 115 occupies becomes larger than the rate that the area of the recessed portion 116 occupies. (In FIG. 12, a first layer surface before cutting is indicated by a dotted line having a symbol 111, and a surface formed after performing cutting is indicated by a solid line having a symbol 112). Alternatively, the rate of the area of the recessed portion 115 and the rate of the area of the recessed portion 116 may be set 50/50. In this manner, the rates of areas of the protruding portion 115 and the recessed portion 116 may be arbitrarily set.

Doing it like this, for example, in a case where the first layer outer layer 11B is hard or machinability of the first layer outer layer 11B is not necessarily good, it is possible to reduce a cutting amount of the first layer outer layer 11B or a cutting area of the first layer outer layer 11B. As a result, it is possible to acquire advantageous effects such as the enhancement of cutting efficiency.

The number or shape of the recessed portions 116 or the number or shape of protruding portions 115 may be arbitrarily set. Further, a stepped portion between the protruding portion 115 and the recessed portion 116 may be inclined in place of being perpendicular.

(2) In the embodiment 1 described above, the first layer 11 is formed of two layers consisting of the first layer inner layer 11A and the first layer outer layer 11B, and the second layer 12 is formed of a single layer. However, the configuration of the first layer 11 and the second layer 12 is not limited to such a configuration. For example, both the first layer 11 and the second layer 12 may be formed of a single layer. The first layer 11 is formed of a single layer, and the second layer 12 is formed of a plurality of layers (number of layers being set arbitrarily). The first layer 11 is formed of a plurality of layers (the number of layers being set arbitrarily) and the second layer 12 is formed of a single layer. Each of the first layer 11 and the second layer 12 is formed of the plurality of layers (the number of layers each of the first layer 11 and the second layer 12 being set arbitrarily).

Figure 13A:
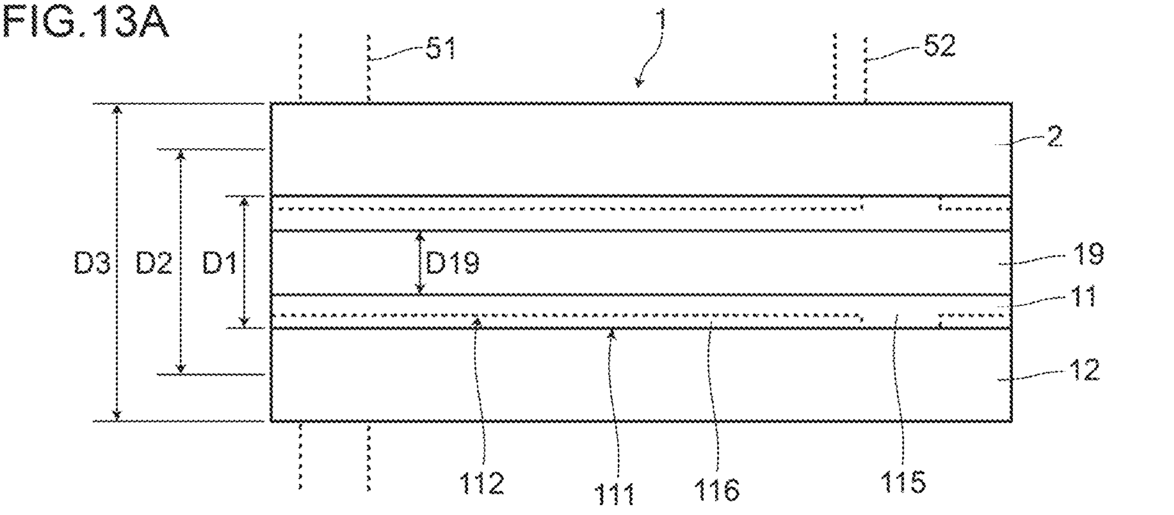
FIG. 13A to FIG. 13C are views for describing a modification of the first layer 11 and a second layer 12.
Figure 13B:
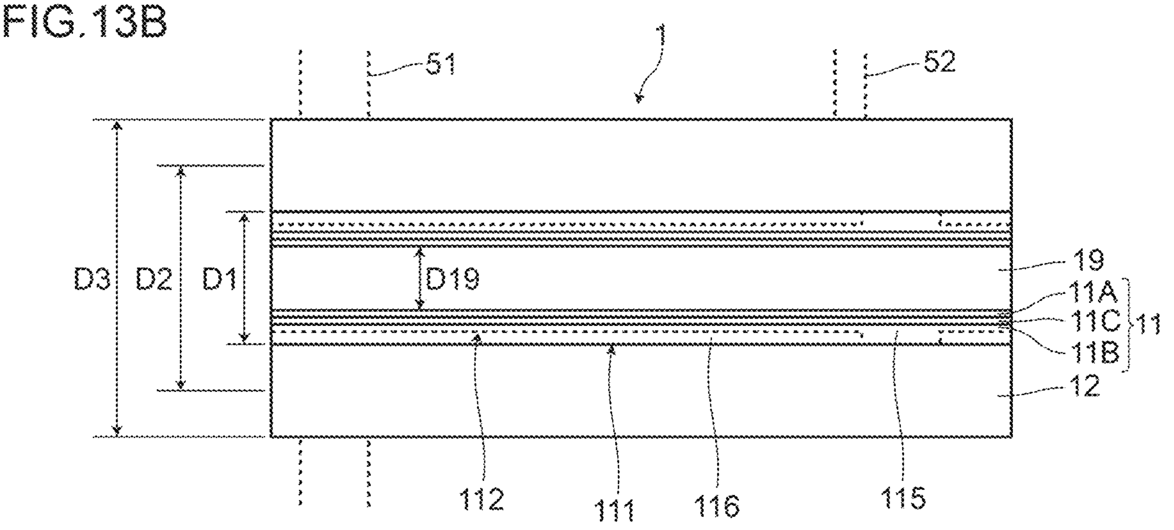
Figure 13C:
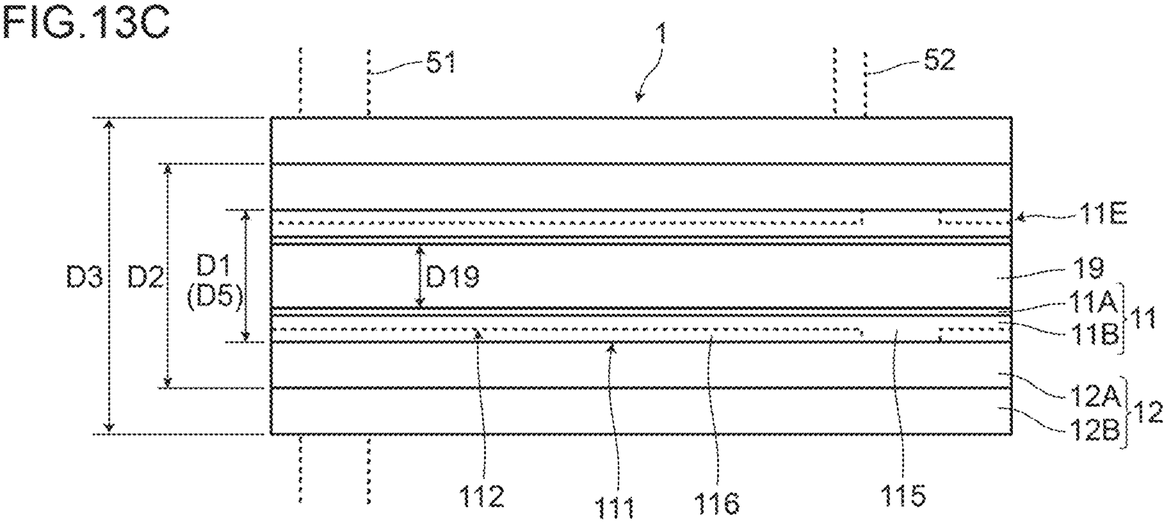
Figure 14:
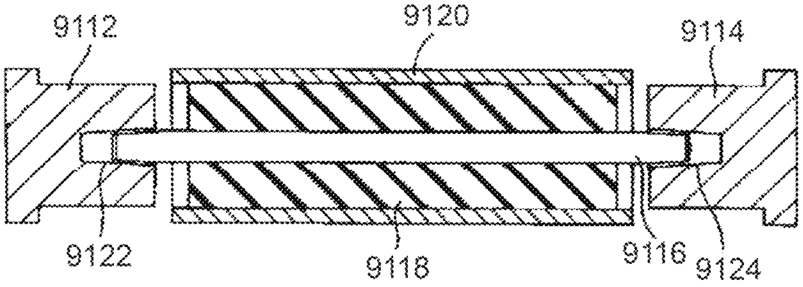
FIG. 14 is a view for describing the prior art.

FIG. 13A to FIG. 13C are views for describing a configuration variant of the first layer 11 or the second layer 12 of the semi-finished pipe 1. For example, as illustrated in FIG. 13A, the first layer 11 may be formed of a single layer. With such a configuration, the configuration of the first layer 11 can be simplified. The forming of the first layer 11 and the manufacture of the semi-finished pipe 1 can be performed easily.

Further, as illustrated in FIG. 13B, the first layer 11 may be formed of three or more layers such as three layers comprising a first layer inner layer 11A, a first layer outer layer 11B, and a first layer intermediate layer 11C formed between the first layer inner layer 11A and the first layer outer layer 11B. With such a configuration, for example, in a case where the adhesion between the first layer inner layer 11A and the first layer outer layer 11B is poor, the adhesion can be improved by the first layer intermediate layer 11C.

Further, as illustrated in FIG. 13C, the second layer 12 may be formed of two or more layers such as a second layer inner layer 12A and the second layer outer layer 12B. With such a configuration, for example, if the single layer second layer 12 is wanted to be stiff for gripping, the second layer outer layer 12B can be easily hardened for grasping, and if the single-layer second layer 12 is wanted to be soften for cutting, the second layer inner layer 12A can be easily softened.

In the above-mentioned embodiments 1 to 16, a stainless steel wire is used as the wire 3 (the core wire). However, the wire 3 is not limited to the stainless steel wire. For example, as the wire 3, a nichrome wire or an iron chrome wire may be used in place of a stainless steel wire.

The nichrome wire is a wire that is obtained by forming an alloy (nichrome) that contains nickel and chromium as main components into a line shape. The nichrome wire may contain small amounts of manganese, iron, carbon, silicon and the like.

Iron chromium wire is a wire obtained by forming iron chromium produced by adding chromium and aluminum to iron, into a line shape. As iron chromium, for example, iron chromium that is marketed under the name of Kanthal (registered trademark) can be named.

(4) Although the description made hereinafter may partially overlap with the description made heretofore, in the embodiments 1 to 16 described above the semi-finished pipe 1 (the first semi-finished pipe 1, the second semi-finished pipe 9) or the finished pipe 2 may not have the protruding portion (115,215) or the recessed portion (116). That is, it is sufficient to adopt any one of the modes consisting of the mode where the semi-finished pipe 1 or the finished pipe 2 has only the protruding portion, the mode where it has only the recessed portion, the mode where it has both the recessed portion and the protruding portion, and the mode where the first finished pipe or the second finished pipe 2 has neither the recessed portion nor the protruding portion (see FIG. 4, FIG. 6, FIG. 8, FIG. 11 and the like).

The invention claimed is:

1. A semi-finished pipe used for forming a finished pipe by cutting performed by a lathe, the semi-finished pipe comprising:

a first layer for forming the finished pipe that remains even after cutting performed by the lathe; and a second layer for a dummy use that is formed on an outer side of the first layer, and forms an object to be cut by the lathe, wherein the first layer and the second layer are made of metals of which the first layer and a portion of the second layer close to the first layer are alloyed to each other by heating the semi-finished pipe, and, the semi-finished pipe further comprises:

a third layer made of metal that is formed on an inner side of the first layer; and an intermediate layer formed between the first layer and the third layer, wherein the intermediate layer is a layer that prevents the metal of the third layer from being alloyed with metal of the first layer and metal of the second layer by heating.

2. The semi-finished pipe according to claim 1, the intermediate layer is made of nickel.

3. A semi-finished pipe used for forming a finished pipe by cutting performed by a lathe, the semi-finished pipe comprising:

a first layer for forming the finished pipe that remains even after cutting performed by the lathe; and a second layer for a dummy use that is formed on an outer side of the first layer, and forms an object to be cut by the lathe, wherein the first layer is made of an alloy, and the second layer is made such that a degree of alloying in the second layer is lowered in an outward direction.

4. A method of manufacturing a semi-finished pipe used for forming a finished pipe by cutting performed by a lathe, the method comprising:

a step of preparing a wire;

a step of forming a first layer for forming the finished pipe that remains even after cutting performed by the lathe on an outer peripheral side of the wire; and a step of forming a second layer for a dummy use that becomes an object to be cut by cutting performed by the lathe on an outer peripheral side of the first layer, wherein in the step of forming the first layer and in the step of forming the second layer, the first layer and the second layer are formed using metals with which the first layer and a portion of the second layer close to the first layer are alloyed when the semi-finished pipe is heated.

5. A pipe manufacturing method for manufacturing a finished pipe from a semi-finished pipe using a lathe, the pipe manufacturing method comprising:

a step of preparing a semi-finished pipe for forming a finished pipe by cutting performed by a lathe, the semi-finished pipe comprising:

a first layer for forming the finished pipe that remains even after cutting performed by the lathe; and a second layer for a dummy use that is formed on an outer side of the first layer, and forms an object to be cut by the lathe, wherein the first layer and the second layer are made of metals of which the first layer and a portion of the second layer close to the first layer are alloyed to each other by heating the semi-finished pipe;

a grasping step of grasping the semi-finished pipe from the outer side of the second layer;

a cutting step of cutting the second layer from the outer side of the second layer such that a part of the second layer remains; and an alloying step of alloying the first layer and the remaining second layer by heating the semi-finished pipe.

6. A pipe manufacturing method for manufacturing a finished pipe from a semi-finished pipe using a lathe, the pipe manufacturing method comprising:

a step of preparing a semi-finished pipe for forming a finished pipe by cutting performed by a lathe, the semi-finished pipe comprising:

a first layer for forming the finished pipe that remains even after cutting performed by the lathe; and a second layer for a dummy use that is formed on an outer side of the first layer, and forms an object to be cut by the lathe, wherein the first layer and the second layer are made of metals of which the first layer and a portion of the second layer close to the first layer are alloyed to each other by heating the semi-finished pipe;

an alloying step of alloying the first layer and a portion of the second layer close to the first layer by heating the semi-finished pipe;

a grasping step of grasping the semi-finished pipe from the outer side of the second layer; and a cutting step of cutting the second layer from the outer side of the second layer down to a portion of the second layer close to the first layer.

* * * * *